United States Patent
Huang et al.

(10) Patent No.: US 12,412,994 B2
(45) Date of Patent: Sep. 9, 2025

(54) ORBITAL ANGULAR MOMENTUM COMMUNICATION WITH VARIABLE ANTENNA NUMBER

(71) Applicant: QUALCOMM INCORPORATED, San Diego, CA (US)

(72) Inventors: Min Huang, Beijing (CN); Danlu Zhang, San Diego, CA (US); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 18/682,803

(22) PCT Filed: Oct. 29, 2021

(86) PCT No.: PCT/CN2021/127245
§ 371 (c)(1),
(2) Date: Feb. 9, 2024

(87) PCT Pub. No.: WO2023/070485
PCT Pub. Date: May 4, 2023

(65) Prior Publication Data
US 2024/0356237 A1    Oct. 24, 2024

(51) Int. Cl.
*H01Q 21/06*        (2006.01)
*H04B 7/0456*       (2017.01)

(52) U.S. Cl.
CPC ......... *H01Q 21/061* (2013.01); *H04B 7/0456* (2013.01)

(58) Field of Classification Search
None
See application file for complete search history.

(56) References Cited

U.S. PATENT DOCUMENTS

| | | | |
|---|---|---|---|
| 2017/0117626 A1* | 4/2017 | Sajuyigbe | H01Q 1/523 |
| 2019/0028165 A1* | 1/2019 | Adachi | H04B 7/0617 |
| 2020/0388935 A1* | 12/2020 | Lee | H04L 27/2634 |
| 2021/0075478 A1 | 3/2021 | Zenkyu et al. | |
| 2022/0094068 A1* | 3/2022 | Jiang | H01Q 15/0086 |

FOREIGN PATENT DOCUMENTS

| | | |
|---|---|---|
| JP | 2018046369 A | 3/2018 |
| WO | WO-2018125084 A1 | 7/2018 |
| WO | WO-2021147613 A1 | 7/2021 |

OTHER PUBLICATIONS

International Search Report and Written Opinion—PCT/CN2021/127245—ISA/EPO—Jun. 6, 2022.

* cited by examiner

*Primary Examiner* — Wilson Lee
(74) *Attorney, Agent, or Firm* — Holland & Hart LLP

(57) ABSTRACT

Methods, systems, and devices for wireless communications are described. A first wireless node may transmit, to a second wireless node, an indication of an orbital angular momentum (OAM) base value that is associated with one or more OAM modes. The OAM base value may correspond to a number of antenna elements of an antenna ring at the first wireless node, and for each of the one or more OAM modes. Based on the OAM base value, the first wireless node may communicate reference signaling according to the one or more OAM modes using the number of antenna elements of the antenna ring. The second wireless node may use a same number of antenna elements based on the indicated OAM base value.

30 Claims, 25 Drawing Sheets

ORBITAL ANGULAR MOMENTUM COMMUNICATION WITH VARIABLE ANTENNA NUMBER

CROSS REFERENCE

The present Application is a 371 national stage filing of International PCT Application No. PCT/CN2021/127245 by Huang et al. entitled "ORBITAL ANGULAR MOMENTUM COMMUNICATION WITH VARIABLE ANTENNA NUMBER," filed Oct. 29, 2021, which is assigned to the assignee hereof, and which is expressly incorporated by reference in its entirety herein.

FIELD OF TECHNOLOGY

The following relates to wireless communications, including orbital angular momentum (OAM) communication with variable antenna number.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support orbital angular momentum (OAM) communications using circular antenna panels at wireless devices in the network. Using such antenna panels, however, may introduce coordination issues between device, which may lead to reduced signal strength received at devices and overall reduced communications efficiency.

SUMMARY

The described techniques relate to improved methods, systems, devices, and apparatuses that support orbital angular momentum (OAM) communication with variable antenna number. Generally, the described techniques provide for OAM-based signaling, which uses a uniform circular array (UCA) transmitting multiplexed OAM modes. To reduce signaling complexity associated with simultaneous or concurrent transmissions of OAM modes to a second wireless node, the first wireless node may support a UCA antenna structure which divides the UCA array into multiple subsets or subrings, with each sub-ring used to generate a respective OAM mode. Additionally, or alternatively, when multiple OAM modes are to be transmitted simultaneously, a device may use multiple sub-rings of the UCA, each of which may transmit a different OAM mode. The first wireless node may transmit an indication of an OAM base value (e.g., a number of antenna elements) associated with one or more OAM modes that the second wireless node may use to receive signaling from the first wireless node. The first wireless node may then transmit communications (e.g., reference signaling, synchronization signaling) to the second wireless node using the indicated OAM mode.

A method for wireless communications at a first wireless node is described. The method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes and communicating, with the second wireless node, one or more reference signals according to the one or more OAM modes using the number of antenna elements of the antenna ring based on the OAM base value.

An apparatus for wireless communications at a first wireless node is described. The apparatus may include a processor, memory coupled with the processor, and instructions stored in the memory. The instructions may be executable by the processor to cause the apparatus to transmit, to a second wireless node, an indication of an OAM base value that is associated with one or more OAM modes, the OAM base value corresponding to a number of antenna elements of an antenna ring of the first wireless node for communications with the second wireless node for each of the one or more OAM modes and communicate, with the second wireless node, one or more reference signals according to the one or more OAM modes using the number of antenna elements of the antenna ring based on the OAM base value.

Another apparatus for wireless communications at a first wireless node is described. The apparatus may include means for transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes and means for communicating, with the second wireless node, one or more reference signals according to the one or more OAM modes using the number of antenna elements of the antenna ring based on the OAM base value.

A non-transitory computer-readable medium storing code for wireless communications at a first wireless node is described. The code may include instructions executable by a processor to transmit, to a second wireless node, an indication of an OAM base value that is associated with one or more OAM modes, the OAM base value corresponding to a number of antenna elements of an antenna ring of the first wireless node for communications with the second wireless node for each of the one or more OAM modes and communicate, with the second wireless node, one or more reference signals according to the one or more OAM modes using the number of antenna elements of the antenna ring based on the OAM base value.

Some examples of the method, apparatuses, and non-transitory computer-readable medium described herein may further include operations, features, means, or instructions for communicating the one or more reference signals using one or more sub-rings of the antenna ring, where each sub-ring of the one or more sub-rings may be associated with a respective OAM mode of the one or more OAM modes.

In some examples of the method, apparatuses, and non-transitory computer-readable medium described herein, each sub-ring of the one or more sub-rings may be associated with a different radio frequency chain for communicating with the second wireless node and a set of the one or more sub-rings includes the number of antenna elements.

Some examples of the method, apparatuses, and non-transitory computer-readable medium described herein may further include operations, features, means, or instructions for applying, to one or more data streams associated with the one or more reference signals, a set of precoding weights based on the one or more OAM modes and the OAM base value.

Some examples of the method, apparatuses, and non-transitory computer-readable medium described herein may further include operations, features, means, or instructions for communicating, with the second wireless node, multiple reference signals according to the one or more OAM modes using one or more sub-rings of the antenna ring, each of the one or more OAM modes corresponding to a respective set of one or more sub-rings of the antenna ring.

In some examples of the method, apparatuses, and non-transitory computer-readable medium described herein, the communicating may include operations, features, means, or instructions for transmitting a first instance of the reference signal using a first set of one or more sub-rings of the antenna ring based on a first base value of the set of multiple base values, the first base value indicating a first number of antenna elements for the first set of one or more sub-rings and transmitting a second instance of the reference signal using a second set of one or more sub-rings of the antenna ring based on a second base value of the set of multiple base values, the second base value indicating a second number of antenna elements for the second set of one or more sub-rings.

In some examples of the method, apparatuses, and non-transitory computer-readable medium described herein, each of the first instance and the second instance includes a channel state information (CSI) reference signals (RSs) precoded according to a set of OAM modes corresponding to the first base value and the second base value.

Some examples of the method, apparatuses, and non-transitory computer-readable medium described herein may further include operations, features, means, or instructions for receiving, from the second wireless node, one or more CSI reports corresponding to the one or more reference signals, the one or more CSI reports indicating the OAM base value.

Some examples of the method, apparatuses, and non-transitory computer-readable medium described herein may further include operations, features, means, or instructions for receiving, from the second wireless node, an indication of the OAM base value selected by the second wireless node, where the indication includes OAM base information and receiving, from the second wireless node, one or more CSI reports associated with the OAM base value based on the OAM base information.

Some examples of the method, apparatuses, and non-transitory computer-readable medium described herein may further include operations, features, means, or instructions for transmitting, to the second wireless node, an indication of one or more OAM base values and transmitting, to the second wireless node, one or more synchronization signal blocks (SSBs) in accordance with the one or more OAM base values.

Some examples of the method, apparatuses, and non-transitory computer-readable medium described herein may further include operations, features, means, or instructions for receiving, from the second wireless node, one or more sounding reference signals (SRSs) in accordance the OAM base value.

In some examples of the method, apparatuses, and non-transitory computer-readable medium described herein, the OAM base value may be selected from a set of OAM base values, each of the set of OAM base values corresponding to a respective number of antenna elements of the antenna ring used for communications with the second wireless node.

A method for wireless communications at a second wireless node is described. The method may include receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes and communicating, with the first wireless node, one or more reference signals according to the one or more OAM modes using the number of antenna elements of the antenna ring based on the OAM base value.

An apparatus for wireless communications at a second wireless node is described. The apparatus may include a processor, memory coupled with the processor, and instructions stored in the memory. The instructions may be executable by the processor to cause the apparatus to receive, from a first wireless node, an indication of an OAM base value that is associated with one or more OAM modes, the OAM base value corresponding to a number of antenna elements of an antenna ring of the first wireless node for communications with the second wireless node for each of the one or more OAM modes and communicate, with the first wireless node, one or more reference signals according to the one or more OAM modes using the number of antenna elements of the antenna ring based on the OAM base value.

Another apparatus for wireless communications at a second wireless node is described. The apparatus may include means for receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes and means for communicating, with the first wireless node, one or more reference signals according to the one or more OAM modes using the number of antenna elements of the antenna ring based on the OAM base value.

A non-transitory computer-readable medium storing code for wireless communications at a second wireless node is described. The code may include instructions executable by a processor to receive, from a first wireless node, an indication of an OAM base value that is associated with one or more OAM modes, the OAM base value corresponding to a number of antenna elements of an antenna ring of the first wireless node for communications with the second wireless node for each of the one or more OAM modes and communicate, with the first wireless node, one or more reference signals according to the one or more OAM modes using the number of antenna elements of the antenna ring based on the OAM base value.

Some examples of the method, apparatuses, and non-transitory computer-readable medium described herein may further include operations, features, means, or instructions for communicating the one or more reference signals using one or more sub-rings of the antenna ring, where each sub-ring of the one or more sub-rings may be associated with a respective OAM mode of the one or more OAM modes.

In some examples of the method, apparatuses, and non-transitory computer-readable medium described herein, each sub-ring of the one or more sub-rings may be associated with a different radio frequency chain for communicating with the first wireless node and a set of the one or more sub-rings includes the number of antenna elements.

Some examples of the method, apparatuses, and non-transitory computer-readable medium described herein may further include operations, features, means, or instructions for applying, to one or more data streams associated with the one or more reference signals, a set of precoding weights based on the one or more OAM modes and the OAM base value.

Some examples of the method, apparatuses, and non-transitory computer-readable medium described herein may further include operations, features, means, or instructions for communicating, with the first wireless node, multiple reference signals with the first wireless node using according to the one or more OAM modes using one or more sub-rings of the antenna ring, each of the one or more OAM modes corresponding to a respective set of one or more sub-rings of the antenna ring.

In some examples of the method, apparatuses, and non-transitory computer-readable medium described herein, the communicating may include operations, features, means, or instructions for receiving a first instance of the reference signal using a first set of one or more sub-rings of the antenna ring based on a first base value of the set of multiple base values, the first base value indicating a first number of antenna elements for the first set of one or more sub-rings and receiving a second instance of the reference signal using a second set of one or more sub-rings of the antenna ring based on a second base value of the set of multiple base values, the second base value indicating a second number of antenna elements for the second set of one or more sub-rings.

In some examples of the method, apparatuses, and non-transitory computer-readable medium described herein, each of the first instance and the second instance includes a CSI-RSs precoded according to a set of OAM modes corresponding to the first base value and the second base value.

Some examples of the method, apparatuses, and non-transitory computer-readable medium described herein may further include operations, features, means, or instructions for transmitting, to the first wireless node, one or more CSI reports corresponding to the one or more reference signals, the one or more CSI reports indicating the OAM base value.

Some examples of the method, apparatuses, and non-transitory computer-readable medium described herein may further include operations, features, means, or instructions for selecting one or more OAM base values to use for communications with the first wireless node, where the indication includes OAM base information and transmitting, to the first wireless node, one or more CSI reports including an indication of the OAM base information.

Some examples of the method, apparatuses, and non-transitory computer-readable medium described herein may further include operations, features, means, or instructions for receiving, from the first wireless node, an indication of one or more OAM base values and receiving, from the first wireless node, one or more SSBs in accordance with the one or more OAM base values.

Some examples of the method, apparatuses, and non-transitory computer-readable medium described herein may further include operations, features, means, or instructions for receiving, from the first wireless node, an indication of one or more OAM base values and transmitting, to the first wireless node, one or more SRSs in accordance with the one or more OAM base values.

In some examples of the method, apparatuses, and non-transitory computer-readable medium described herein, the OAM base value may be selected from a set of OAM base values, each of the set of OAM base values corresponding to a respective number of antenna elements of the antenna ring used for communications with the first wireless node.

DETAILED DESCRIPTION

Some wireless communications systems such as 6G mobile systems may support communications using Orbital Angular Momentum (OAM) based signaling, which uses a Uniform Circular Array (UCA) as one type of antenna panel capable of realizing multiplexed modes in OAM. A UCA panel includes at least one ring of antenna elements, which produces spatially overlapped helical waves for carrying streams of data. A UCA panel can be divided into two parts, an outer section with larger radii which can support OAM communications and an inner section with smaller radii which may not be useable for OAM communications. A device may use the UCA antenna panel to transmit OAM modes via all UCA antennas of the array using different radio-frequency (RF) combiners to separate the different OAM modes. In some cases, a device may transmit multiple OAM modes simultaneously to increase throughput, and uses multiple RF combiners multiplexed using an RF multiplexer. Such RF multiplexers, however, may increase signaling complexity and hardware cost for the device.

To support high throughput by simultaneous transmission of different OAM modes, a device may implement a structure for OAM antennas that may not use an RF combiner for combining multiple OAM modes. For example, UCA antennas at a device may be divided into multiple subsets or subrings, with each sub-ring used to generate a single OAM mode (which eliminates the use of the RF multiplexer). Additionally or alternatively, when multiple OAM modes are to be transmitted simultaneously (e.g., to increase throughput), a device may use multiple sub-rings of the UCA, each of which may transmit a different OAM mode.

The use of the sub-ring structure of the UCA antenna may further support reference signaling reporting between OAM devices. For example, a transmitting device may transmit an indication of a selected OAM base it will use for transmitting channel status information reference signals (CSI-RSs). A receiving device may receive the indication of the OAM base and may determine how many transmitting antennas of the UCA the transmitting device uses for transmitting the CSI-RSs, and the receiving device may use the same number of receiving antennas to receive the CSI-RSs. The receiving device may then perform CSI measurements and transmit a CSI report including the selected OAM base to the transmitting device. Similar techniques may be implemented for transmitting and receiving synchronization signal blocks (SSBs), sounding reference signals (SRSs), or both.

Aspects of the disclosure are initially described in the context of wireless communications systems. Aspects of the disclosure are further illustrated by and described with reference to apparatus diagrams, UCA antenna configurations, UCA precoding configurations, a process flow, system diagrams, and flowcharts that relate to OAM communication with variable antenna number.

Figure 1:
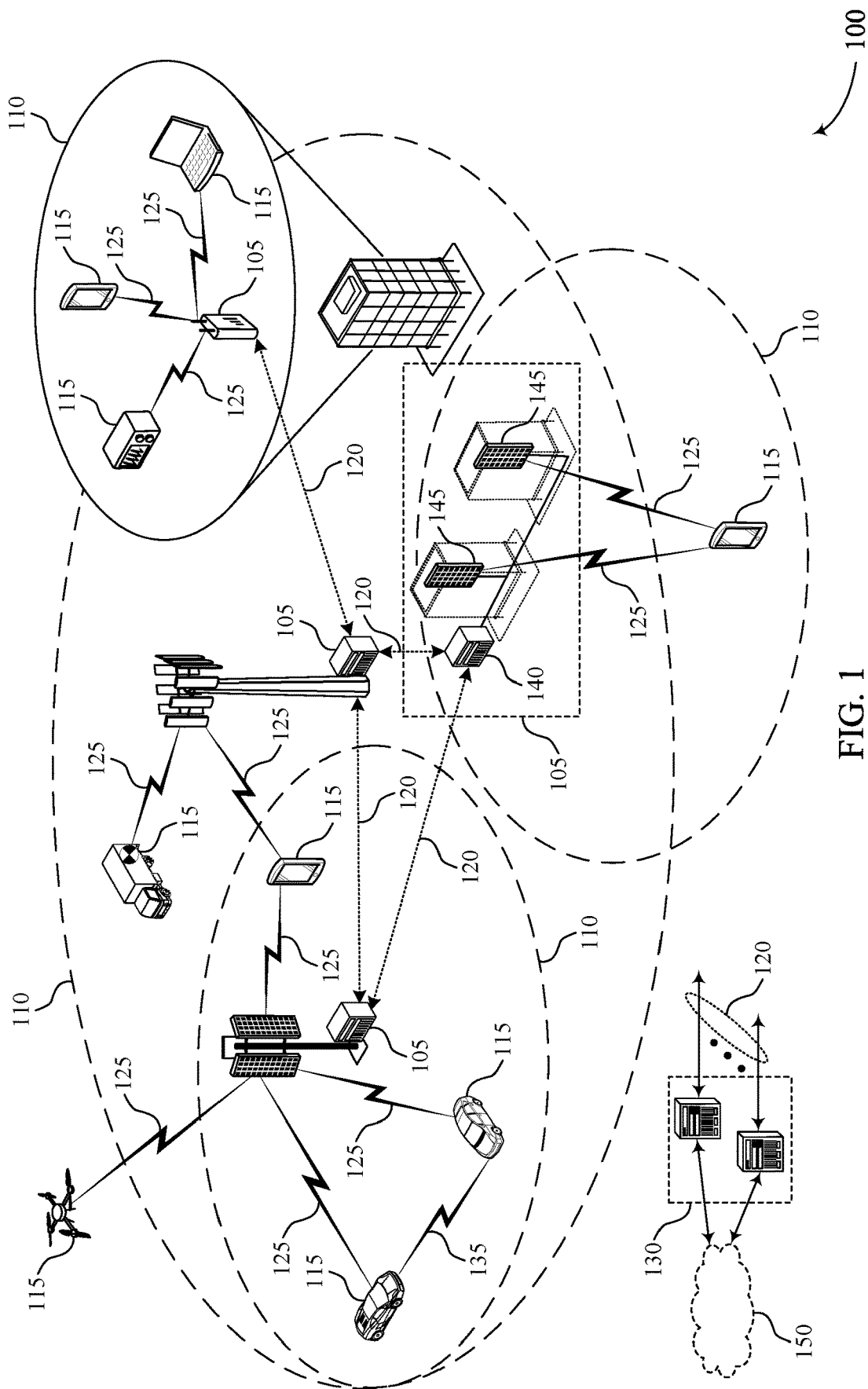
FIGS. 1-2 illustrate examples of wireless communications systems that support orbital angular momentum (OAM) communication with variable antenna number in accordance with aspects of the present disclosure.

FIG. 1 illustrates an example of a wireless communications system 100 that supports OAM communication with variable antenna number in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems may support OAM-based signaling, which uses a UCA as one type of antenna panel for transmitting multiplexed OAM modes. A UCA panel includes at least one ring of antenna elements, which produces spatially overlapped helical waves for carrying streams of data. A device may use the UCA antenna panel to transmit OAM modes via all UCA antennas of the array using different RF combiners to separate the different OAM modes. In some cases, a device may transmit multiple OAM modes simultaneously to increase throughput, and uses multiple RF combiners multiplexed using an RF multiplexer. Such RF multiplexers, however, may increase signaling complexity and hardware cost for the device.

To support high throughput using a UCA panel, a device may implement a structure for OAM antennas that may not use an RF combiner for combining multiple OAM modes. Instead, UCA antennas at a device may be divided into multiple subsets or subrings, with each sub-ring used to generate a single OAM mode, thus eliminating the use of the RF multiplexer. Additionally, or alternatively, when multiple OAM modes are to be transmitted simultaneously, a device may use multiple sub-rings of the UCA, each of which may transmit a different OAM mode.

The use of the sub-ring structure of the UCA antenna may further support reference signaling reporting between OAM devices. For example, a transmitting device such as a base station 105 may transmit an indication of a selected OAM base it will use for transmitting channel status information reference signals (CSI-RSs). A receiving device such as a UE 115 or another base station 105 may receive the indication of the OAM base and may determine how many transmitting antennas of the UCA the transmitting device uses for transmitting the CSI-RSs, and the receiving device may use the same number of receiving antennas to receive the CSI-RSs. The receiving device may then perform CSI measurements and transmit a CSI report including the selected OAM base to the transmitting device.

Figure 2:
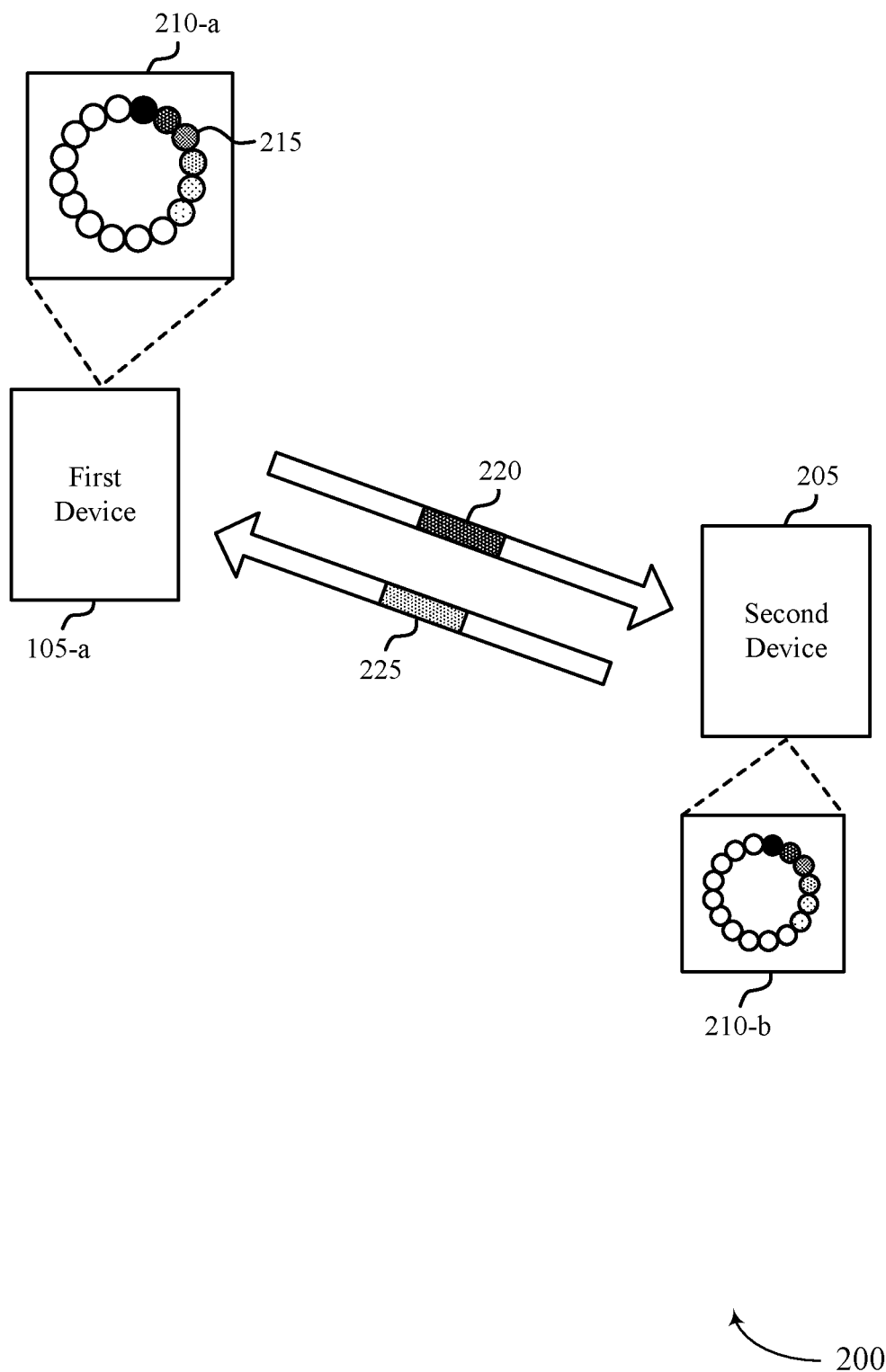

FIG. 2 illustrates an example of a wireless communications system 200 that supports OAM communication with variable antenna number in accordance with aspects of the present disclosure. In some examples, wireless communications system 200 may implement aspects of wireless communications system 100. The wireless communications system 200 may illustrate communications between a base station 105-a and a second device 205, where the second device 205 may another base station, a UE 115 as described with reference to FIG. 1, an IAB node, or a relay node, among other devices. In some cases, the base station 105-a may serve a geographic coverage area. In some examples, the wireless communications system 200 (which may be an example of a sixth generation (6G) system, a 5G system, or another generation system) may support high frequency communications (e.g., up to 3,000 GHz) and increased bandwidths (e.g., relative to lower frequency wireless systems), which may increase data rates within the wireless communications system 200. Additionally or alternatively, the higher frequency bands supported by wireless communications system 200 may be associated with denser network nodes and increased backhaul to accommodate higher frequency communications.

In some implementations of wireless communications system 200, devices may support OAM-based communications. For example, the base station 105-a and the second device 205 may transmit or receive OAM beams, or OAM-related signals over backhaul communication link within the geographic coverage area. For example, one or both of the base station 105-a and the second device 205 may be equipped with a transmitter circle array (e.g., UCAs) or a transmitter antenna ring which may generate OAM beams using DFT based codebooks.

OAM-based communication may be associated with a line-of-sight transmission scheme for high spatial multiplexing with low complexity. From the transmitter (e.g., base station 105-a) to the receiver (e.g., second device 205) OAM signals include multiple coaxially propagating and spatially-overlapping electromagnetic waves, with each wave carrying a data stream. The wavefront of an OAM wave may have a helical shape. The phase of an OAM wave in a transverse plane may have the form of exp(iφl), φ is the azimuthal angle of the OAM wave and l. is an unbounded integer (referred to as an OAM order or mode index).

Helical wavefronts may be generated in several ways. For example, helical wavefronts may be generated by SPPs, for example as illustrated with reference to FIG. 3. SPPs may generate helical waves in the space between the transmitter and the receiver. In some other examples, helical wavefronts may be generated by transmitter circle arrays (e.g., UCA panels). Transmitter circle arrays may generate helical waves in distributed points, such that the received signals at antenna elements of a receiver UCA circle may have the same or similar amplitude and progressive phases. Transmitter circle array-based OAM, or UCA-based OAM, may be considered transmitter circle array-based or UCA-based MIMO. Transmitter circle array-based OAM, or UCA-based OAM may be associated with high spatial multiplexing degree in a line-of-sight (LOS) channel, which may be associated with a high data rate. Transmitter circle array-based OAM, or UCA-based OAM may be associated with static transmitter/receiver beamforming vector weights. Static transmitter/receiver beamforming vector weights may not involve inter-mode equalization at baseband (under direct alignment conditions), and thus may be associated with a low baseband processing complexity.

With transmitter circle arrays, OAM beams generated via DFT vectors are transmitted in the direction of the boresight of the transmitter circle array (e.g., in the direction perpendicular to the direction of the transmitter circle array panel). Accordingly, the second device 205 may be at a fixed location with respect to the base station 105-a.

In some examples, a first device 105-a may use a first UCA antenna 210-a panel to transmit OAM modes via all UCA antennas of the array using different radio-frequency (RF) combiners to separate the different OAM modes. In some cases, the first device 105-a may transmit multiple OAM modes simultaneously to increase throughput, which may use multiple RF combiners multiplexed using an RF multiplexer at the first device 105-a. Such RF multiplexers, however, may increase signaling complexity and hardware cost for the first device 105-a, and may increase the likelihood of inter-mode interference with the second device 205.

To support high throughput by simultaneous transmission of different OAM modes, the first device 105-a may implement a structure for OAM antennas that may not use an RF combiner for combining multiple OAM modes. For example, UCA antenna rings 210-a and 210-b at the first wireless device 105-a and the second wireless device 205 may be divided into multiple subsets or subrings 215, with each sub-ring used to generate a single OAM mode (which eliminates the use of the RF multiplexer). Additionally or alternatively, when multiple OAM modes are to be transmitted simultaneously (e.g., to increase throughput), the first device 105-a may use multiple sub-rings 215 of the UCA 210-a, each of which may transmit a different OAM mode.

The use of the sub-ring structure of the UCA 210 may further support reference signaling reporting between the first device 105-a and the second device 205. For example, the first device 105-a may transmit an indication 220 of a selected OAM base it will use for transmitting CSI-RSs. The second device 205 receive the indication of the OAM base and may determine how many transmitting antennas of the UCA 210-a the transmitting device uses for transmitting the CSI-RSs, and the second device 205 may use the same number of receiving antennas to receive the CSI-RSs at the UCA 210-b. The second device 205 may then perform CSI measurements and transmit a CSI report 225 including the selected OAM base to the first device 105-a.

Figure 3:
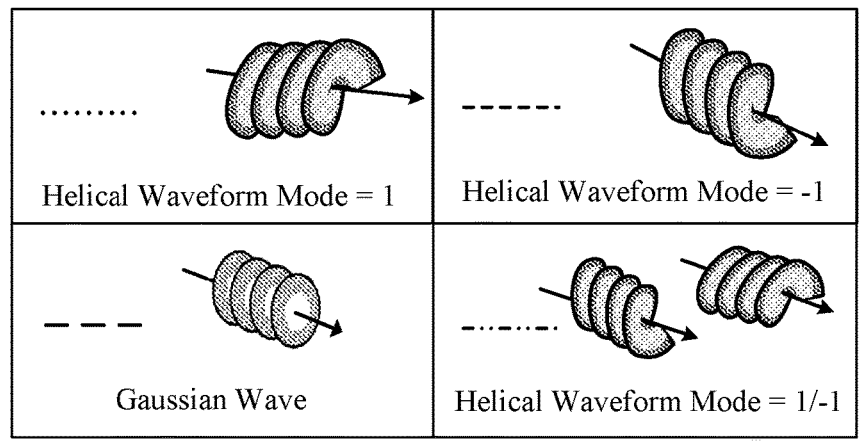
FIG. 3 illustrates an example of a spiral phase plate (SPP) OAM configuration that supports OAM communication with variable antenna number in accordance with aspects of the present disclosure.
Figure 3:
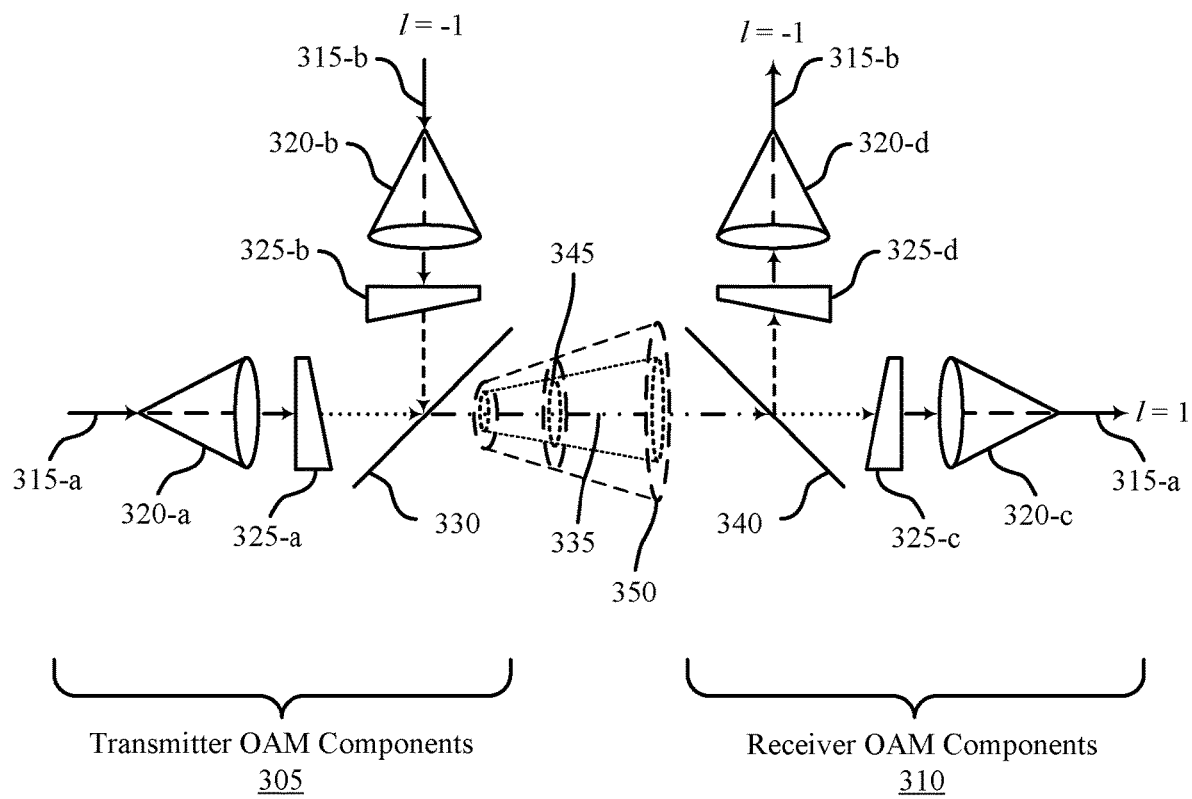

FIG. 3 illustrates an example of an SPP OAM configuration 300 that supports OAM communication with variable antenna number in accordance with aspects of the present disclosure. In some examples, the SPP OAM configuration 300 may implement aspects of wireless communications systems 100 or 200. In this example, a transmitting device (e.g., a base station) may include transmitter OAM components 305 and a receiving device (e.g., a UE, another base station, IAB node, or a relay node) may include receiver OAM components 310. The transmitter OAM components 305 may support transmission of non-DFT beams using a transmitter circle array such as a UCA panel, which may be configured based on feedback from the receiving device using receiver OAM components 310. The transmitter OAM components 305 or receiver OAM components 310 may be supported by a base station 105 or a UE 115, or other wireless device, as described herein.

In cases in which the wireless devices use an SPP methodology, the transmitting device may convert an electromagnetic wave 315 associated with an OAM mode index l=0 (e.g., a non-helical electromagnetic wave associated with mode-zero OAM) into an electromagnetic wave associated with an OAM mode index l≠0 (e.g., a helical electromagnetic wave associated with a non-zero OAM mode) based on passing the electromagnetic wave through an aperture 320 (or an array of apertures 320) and an SPP 325. Such an SPP 325 may be associated with geometric constraints and may be able to generate an electromagnetic wave associated with a single OAM mode. Thus, the wireless device may use one SPP 325 to generate an OAM beam 335 associated with one OAM mode. As such, a wireless device may implement a different SPP 325 for each OAM beam 335 that is associated with a different OAM mode.

SPPs 325 may be made of a high-density polyethylene. An SPP may be a round plate with a thickness that linearly increases with azimuth angles. In some examples in which a radio wave propagates through an SPP, such as SPP 325, the spiral surface of the SPP 325 induces different phase shifts, thereby generating a helical wave (e.g., an OAM beam), as the corresponding phase plane has a spiral shape. Due to the different slopes of different SPPs (e.g., SPPs 325-a, 325-b, 325-c, and 325-b), the wave of one OAM mode may be mitigated by the receiver aperture of any different OAM mode.

In the example of FIG. 3, two OAM modes may be used (e.g., l=+1 and −1). In the transmitter OAM components 305, a first electromagnetic wave 315-a may be input to a first aperture 320-a and a first SPP 325-a, and a second electromagnetic wave 315-b may be input to a second aperture 320-b and a second SPP 325-b. A beam splitter/combiner 330 may combine the output of the first SPP 325-a and the second SPP 325-b to generate OAM beam 335. The receiver OAM components 310 may receive the OAM beam 335 as a beam splitter/combiner 340 to provide instances of the OAM beam 335 to a third SPP 325-c and a fourth SPP 325-d that provide output to a first receiver aperture 320-c and a second receiver aperture 320-d, respectively. The third SPP 325-c may have geometric constraints corresponding to the first SPP 325-a and thus the output of the first receiver aperture 320-c may correspond to the first electromagnetic wave 315-a (e.g., for OAM Mode=1). In addition, the fourth SPP 325-d may have geometric constraints corresponding to the second SPP 325-b and thus the output of the second receiver aperture 320-d may correspond to the second electromagnetic wave 315-b (e.g., for OAM Mode1=2). In devices that use SPP methodologies, separate SPPs 325-a may thus be used for each OAM mode, and the number of SPPs 325 at a device may constrain the number of usable OAM modes. Thus, in some examples, SPPs may generate waveforms with a large number of orthogonal OAM modes. In some other examples, the number of OAM modes that may be generated by SPPs may be limited. Higher-order OAM modes have a larger dispersion, as a receiver aperture with a certain size may capture a limited number of OAM modes. For example, as shown in FIG. 3, signals of OAM mode 3 (indicated by reference number 350) may disperse faster than signals of OAM mode 1 (indicated by reference number 345). If the signal strength of OAM mode 3 (350) is larger than receiver aperture (e.g., receiver aperture 320-c or 320-d), the receiver aperture may not be able to capture the signal of OAM mode 3 and may capture the signal of OAM mode 1.

As one SPP may generate one OAM mode, high dimensional multiplexing may be associated with a large number of SPPs. Accordingly, the degree of multiplexing that may be achieved by SPPs may be limited. As discussed, wireless devices described herein, such as those that may include transmitter OAM components 305 or receiver OAM components 310, or both, may support OAM communication with variable antenna number, an example of such a device is described with reference to FIG. 4.

Figure 4:
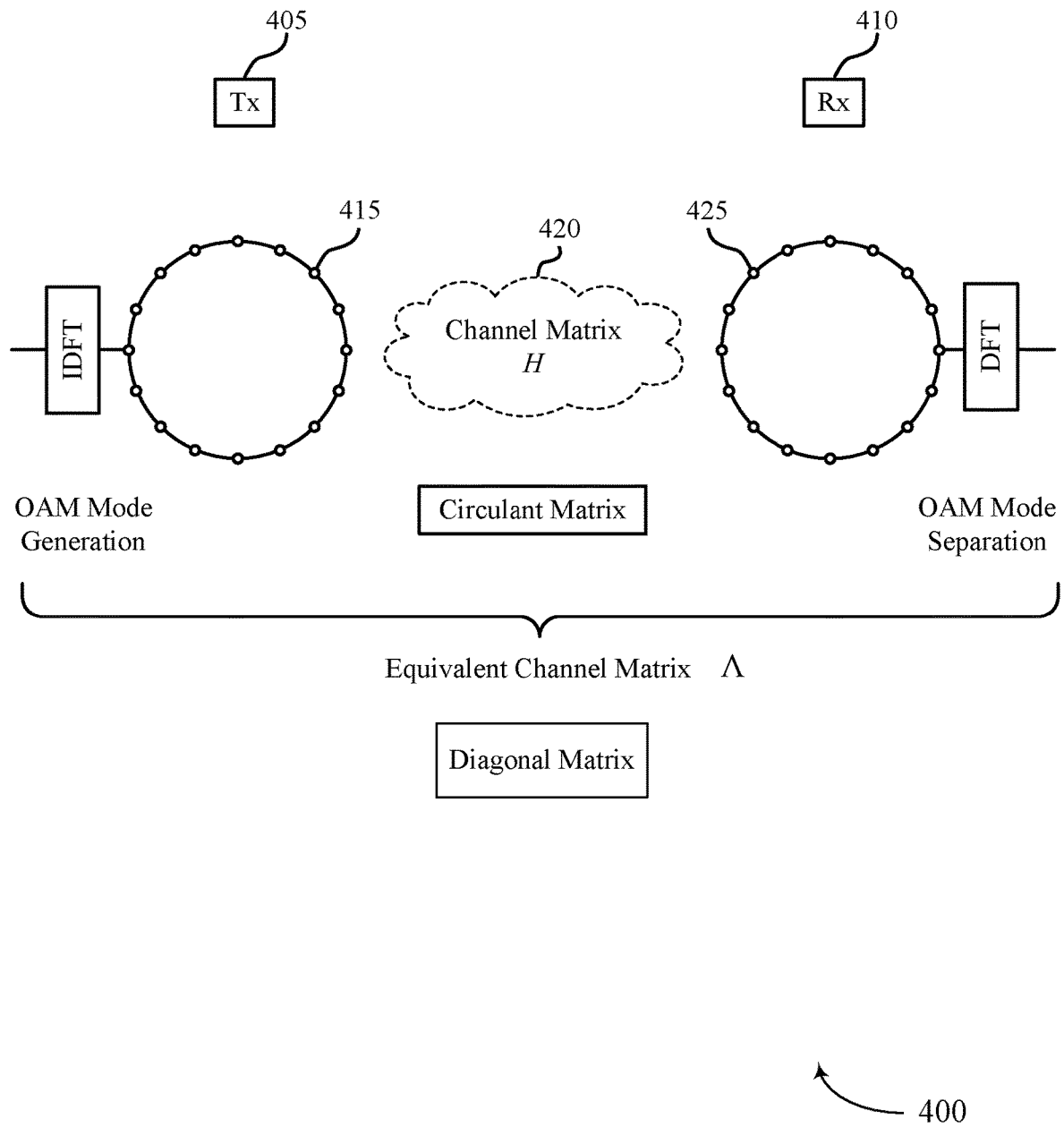
FIGS. 4-8 illustrates examples of uniform circular array (UCA) antenna configurations that support OAM communication with variable antenna number in accordance with aspects of the present disclosure.

FIG. 4 illustrates an example of a UCA configuration 400 that supports OAM communication with variable antenna number in accordance with aspects of the present disclosure. In some examples, the UCA configuration 400 may implement aspects of wireless communications systems 100 or 200. In this example, a transmitting device (e.g., a base station) may include OAM transmitter UCA antennas 405 and a receiving device (e.g., another base station, a UE, IAB node, or a relay node) may include OAM receiver UCA antennas 410. UCA antenna circles may be used at the transmitter to form phase-shifted received signal values at discrete element positions of UCA antenna circles at the receiver in order to realize multiplexed modes in OAM-based communications, and may be produced at a lower cost as compared to SPPs.

In some aspects, one or both of the OAM transmitter UCA antennas 405 or the OAM receiver UCA antennas 410 may be implemented as a planar array of antenna elements which may be an example of or otherwise function as a (massive or holographic) MIMO array or an intelligent surface. In some cases, the transmitting device may identify a set of antenna elements 415 of the planar array that form a transmitter UCA 405, and a receiving device may identify a set of antenna elements 425 of the planar array that form a receiver UCA 410.

The channel matrix 420 may be denoted from each transmit antenna to each receive antenna as H. The channel matrix 420 may be a circulant matrix, and thus its eigen vectors may be equal to DFT vectors. Because the eigen vectors may be equal to DFT vectors, when DFT vectors are used to generate OAM modes (at the transmitter) and separate OAM modes (at the receiver), there is no inter-channel or inter-mode interference. In the UCA configuration 400, the transmitter UCA 405 and the receiver UCA 410 may be co-axial, and have the same number of antenna elements, however the transmitter UCA 405 and the receiver UCA 410 may have different radii. The channel matrix 420, for OAM beams transmitted by the UCA transmitter 405 to the UCA transceiver 410 may be given by Equation 1, shown below.

$$h_{n,m} = \frac{\sqrt{G}\lambda}{4\pi d_{m,n}} \exp\left(-j2\pi \frac{d_{m,n}}{\lambda}\right) \quad (1)$$

Figure 5:
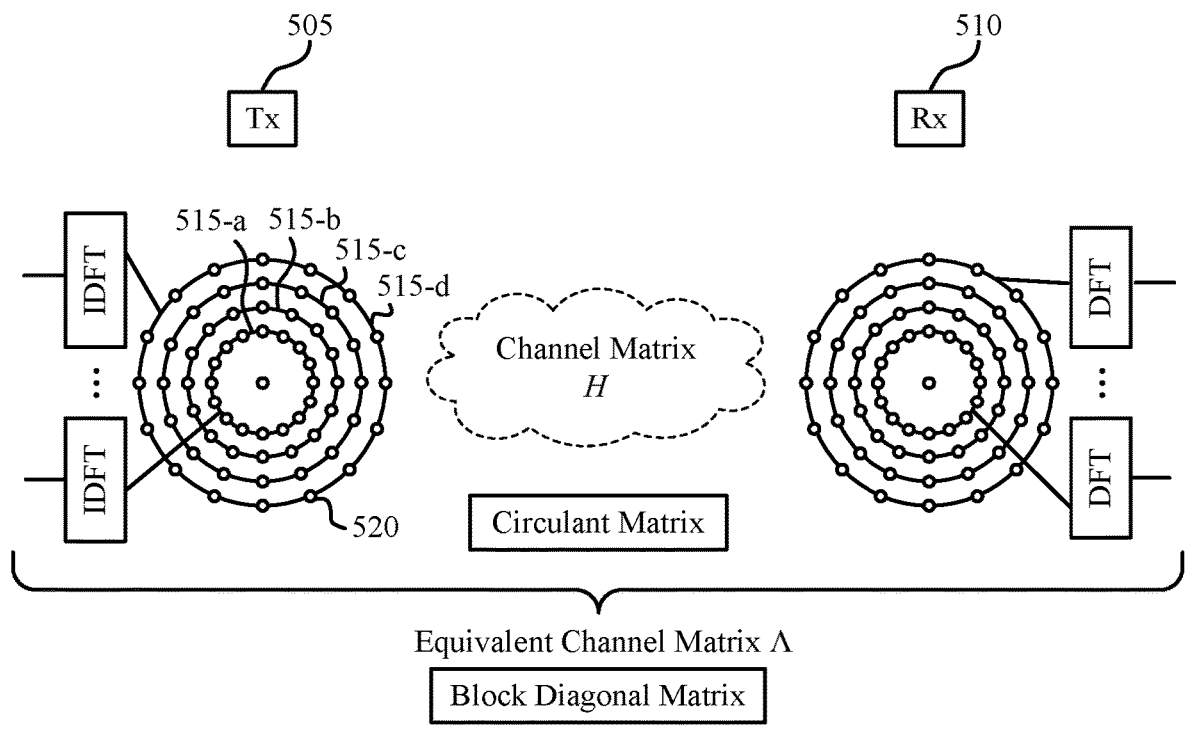
Figure 5:
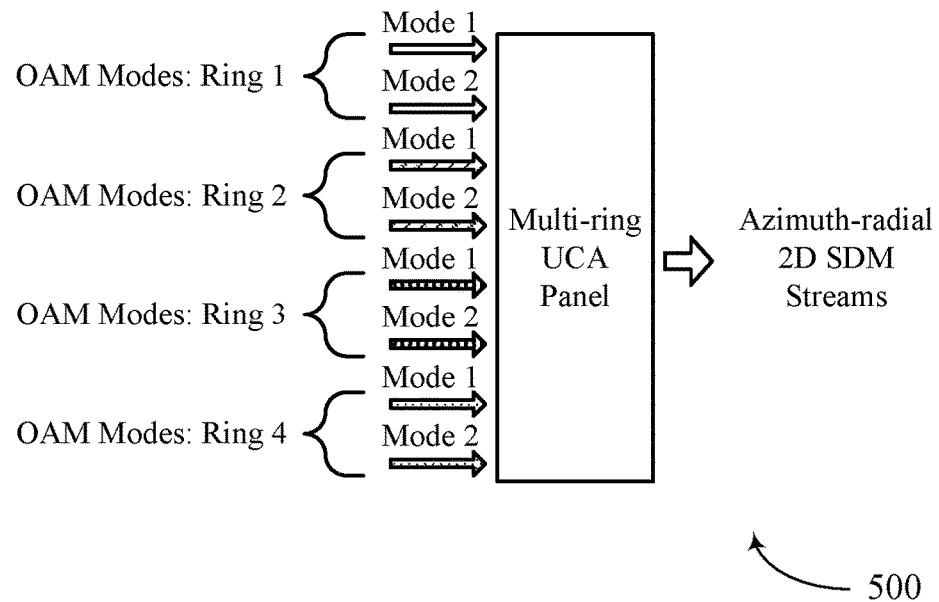

FIG. 5 illustrates an example of a UCA antenna ring configuration 500 that supports OAM communication with variable antenna number in accordance with aspects of the present disclosure. In some examples, the multi-circle transmitter circle array 500 may implement aspects of wireless communications systems 100 or 200. In this example, a transmitting device (e.g., a base station or UE) may include a transmitter circle array 500 (e.g., a UCA panel). The transmitter circle array 500 may include transmitter circles 515-a, 515-b, 515-c, and 515-d. Each transmitter circle includes one or more antenna elements 520.

Multi-circle transmitter circle arrays, such as the transmitter circle array 500, may be used to further increase a spatial multiplexing degree in the radial dimension, and to increase beamforming gain. For transmitting OAM beams, circles of the transmitter may be co-axial and have the same number of antenna elements. For receiving OAM beams, the circles of the receiver circle array may also be co-axial and have the same number of antenna elements. Intra-circle streams with different modes are orthogonal. The inter-circle streams are orthogonal with different OAM modes and non-orthogonal with the same OAM mode.

For example, circles 515-a, 515-b, 515-c, and 515-d may be used to transmit OAM beams. Streams of multiple OAM modes in the circle array may include a mode 1 stream and a mode 2 stream. Streams of multiple OAM modes in circle 515-c may include a mode 1 stream and a mode 2 stream.

Streams of multiple OAM modes in circle 515-*b* may include a mode 1 stream and a mode 2 stream. Streams of multiple OAM modes in circle 515-*a* may include a mode 1 stream and a mode 2 stream. The transmitter circle array 500 then transmits azimuth-radial two-dimensional spatial multiplexed streams accordingly.

The channel matrix H may be a circulant matrix, and thus its eigen vectors may be equal to DFT vectors. Because the eigen vectors may be equal to DFT vectors, when DFT vectors are used to generate OAM modes (at the transmitter) and separate OAM modes (at the receiver), there is no inter-channel or inter-mode interference. In the UCA panel 500, the transmitter UCA 505 and the receiver UCA 510 may be co-axial, and have the same number of antenna elements, however the transmitter UCA 505 and the receiver UCA 510 may have different radii.

Figure 6:
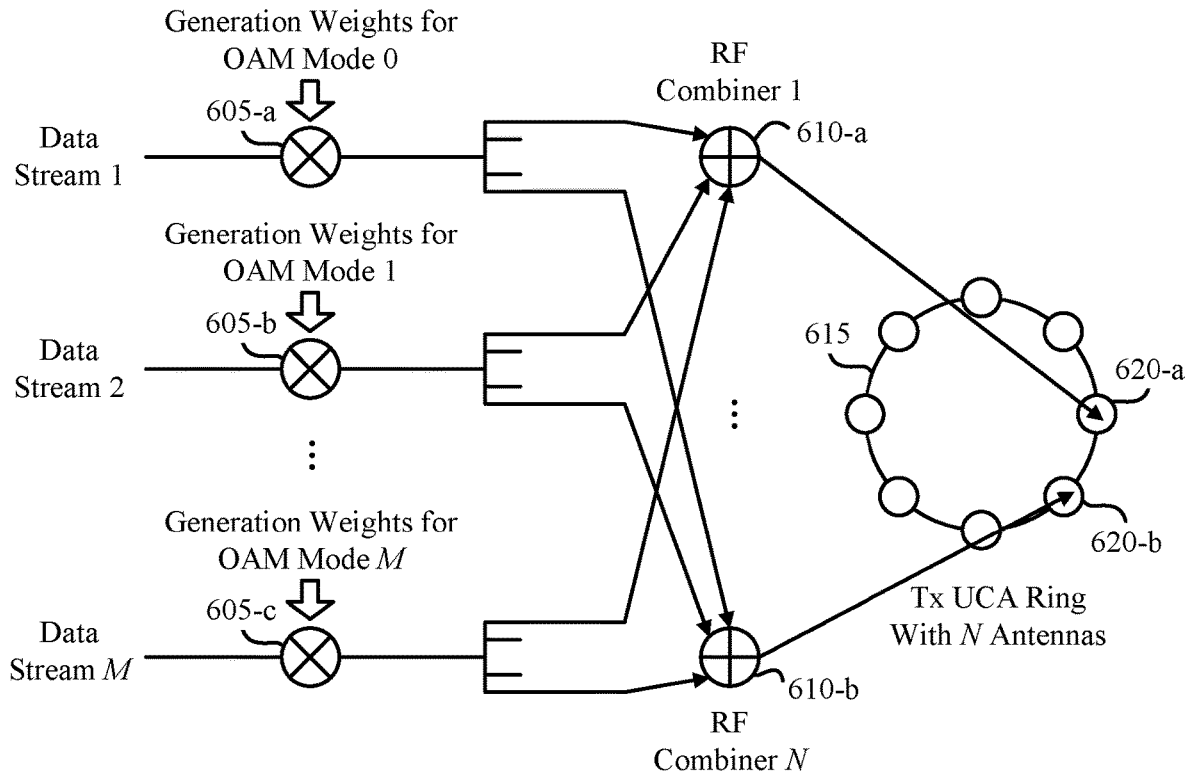

FIG. 6 illustrates an example of a UCA configuration 600 that supports OAM communication with variable antenna number in accordance with aspects of the present disclosure. In some examples, the UCA configuration 600 may implement aspects of wireless communications systems 100 or 200. In this example, a transmitting device or a receiving device (e.g., a base station or a UE) may implement UCA configuration 600.

In some examples, the UCA configuration may use multiple OAM modes to communicate OAM signaling. In some cases, however, the UCA configuration 600 may use multiple separate RF chains for the multiple OAM modes, which increases the complexity used for signal processing and transmission. For example, the RF chain of an OAM mode may be connected to all the antennas in the UCA antenna ring such that if two OAM modes are multiplexed with this antenna ring, their RF chains may be combined at each antenna in the ring. Each data stream (e.g., data streams 1, 2, and 3) may be associated with a different OAM mode 605, and may be combined or multiplexed with the antenna ring 615 using RF combiners 610. Each RF combiner 610 may further be associated with a different antenna element 620 of the UCA ring 615 (e.g., all antenna array elements within the UCA antenna array may share the same RF chain). In such examples, the UCA configuration 600 may include a large number of RF combiners 610 to support RF chain combining for the multiple OAM modes.

In some cases, to reduce signaling complexity and hardware costs associated with having multiple RF combiners, an OAM configuration may support communications having a variable antenna number, which may reduce the number of RF combiners 610 or eliminate RF combiners 610 used to combine the RF chains for multiple OAM modes, as described herein.

Figure 7:
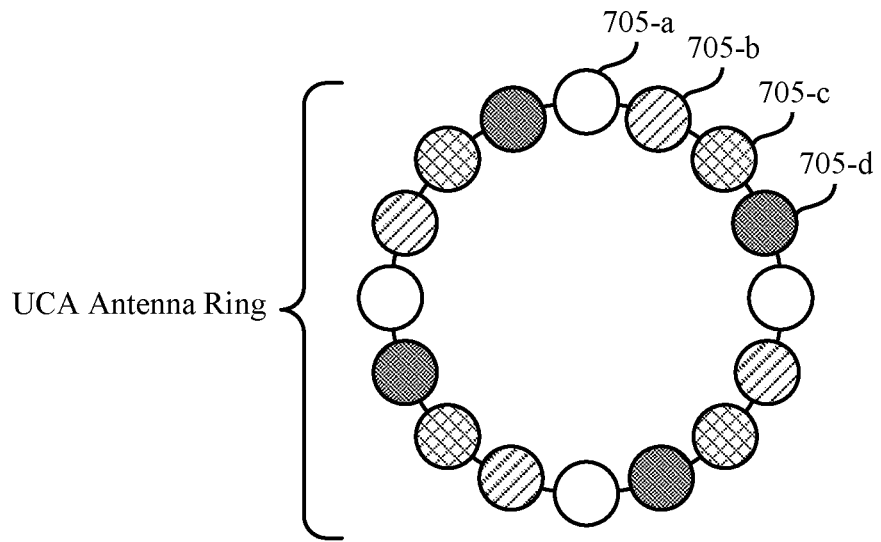
Figure 7:
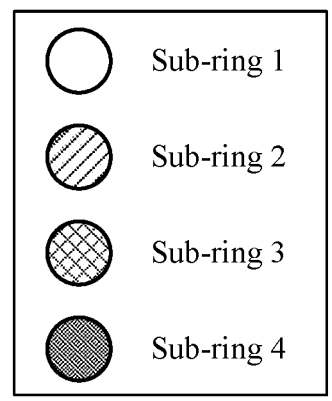

FIG. 7 illustrates an example of a UCA antenna ring configuration 700 that supports OAM communication with variable antenna number in accordance with aspects of the present disclosure. In some examples, the UCA antenna ring 700 may implement aspects of wireless communications systems 100 or 200. In this example, a transmitting device or a receiving device (e.g., a base station or a UE) may implement UCA antenna ring 700.

To support OAM communications using a variable number of antennas, the UCA antenna ring 700 may have multiple sub-rings 705-*a*, 705-*b*, 705-*c*, 705-*d*, and so on (e.g., through 705-N) that a device may utilize for communications signaling. For example, the UCA antenna ring 700 may include a total number of antennas (e.g., N antennas) which may be evenly divided into multiple sub-rings (e.g., M sub-rings) in a comb form. Each sub-ring (with N/M antennas) may be further associated with its own RF chain.

In such cases, the UCA antenna ring 700 may transmit up to M different OAM modes that have the same OAM base (e.g., where the OAM base corresponds to the number of used transmission antennas, the size of DFT vector), and each OAM mode may be transmitted using a different sub-ring 705 of the UCA antenna ring 700 or by using different sub-ring groups of the UCA antenna ring 700. In addition, the angular offset between Tx UCA and Rx UCA may not affect the inter-mode orthogonality between different OAM modes associated with the different sub-rings 705.

By using different sub-rings or different sub-ring groups to transmit the different OAM modes, the UCA ring 700 may support simultaneous transmissions of 1≤M'≤M OAM modes and each OAM modes use M/M' sub-rings and N/M' antenna elements, where $$B = \frac{N}{M'}$$

is an integer corresponding to the OAM base of this OAM mode. For example, if N=16, M=4, then possible values for M' include: M'=1, 2 or 4. This UCA ring can simultaneously transmit 1 base-16 OAM mode, 2 base-8 OAM modes or 4 base-4 OAM modes. Table 1 shows additional examples of the antenna element index, sub-ring index, and OAM mode index for different values of M'.

TABLE 1

|  | Antenna Element Index | | | | | | | | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 |
| Sub-ring index | 1 | 2 | 3 | 4 | 1 | 2 | 3 | 4 | 1 | 2 | 3 | 4 | 1 | 2 | 3 | 4 |
| OAM mode index M' = 1 (base = 16) | 1 | 1 | 1 | 1 | 1 | 1 | 1 | 1 | 1 | 1 | 1 | 1 | 1 | 1 | 1 | 1 |
| OAM mode index M' = 2 (base = 8) | 1 | 2 | 1 | 2 | 1 | 2 | 1 | 2 | 1 | 2 | 1 | 2 | 1 | 2 | 1 | 2 |
| OAM mode index M' = 4 (base = 4) | 1 | 2 | 3 | 4 | 1 | 2 | 3 | 4 | 1 | 2 | 3 | 4 | 1 | 2 | 3 | 4 |

Figure 8:
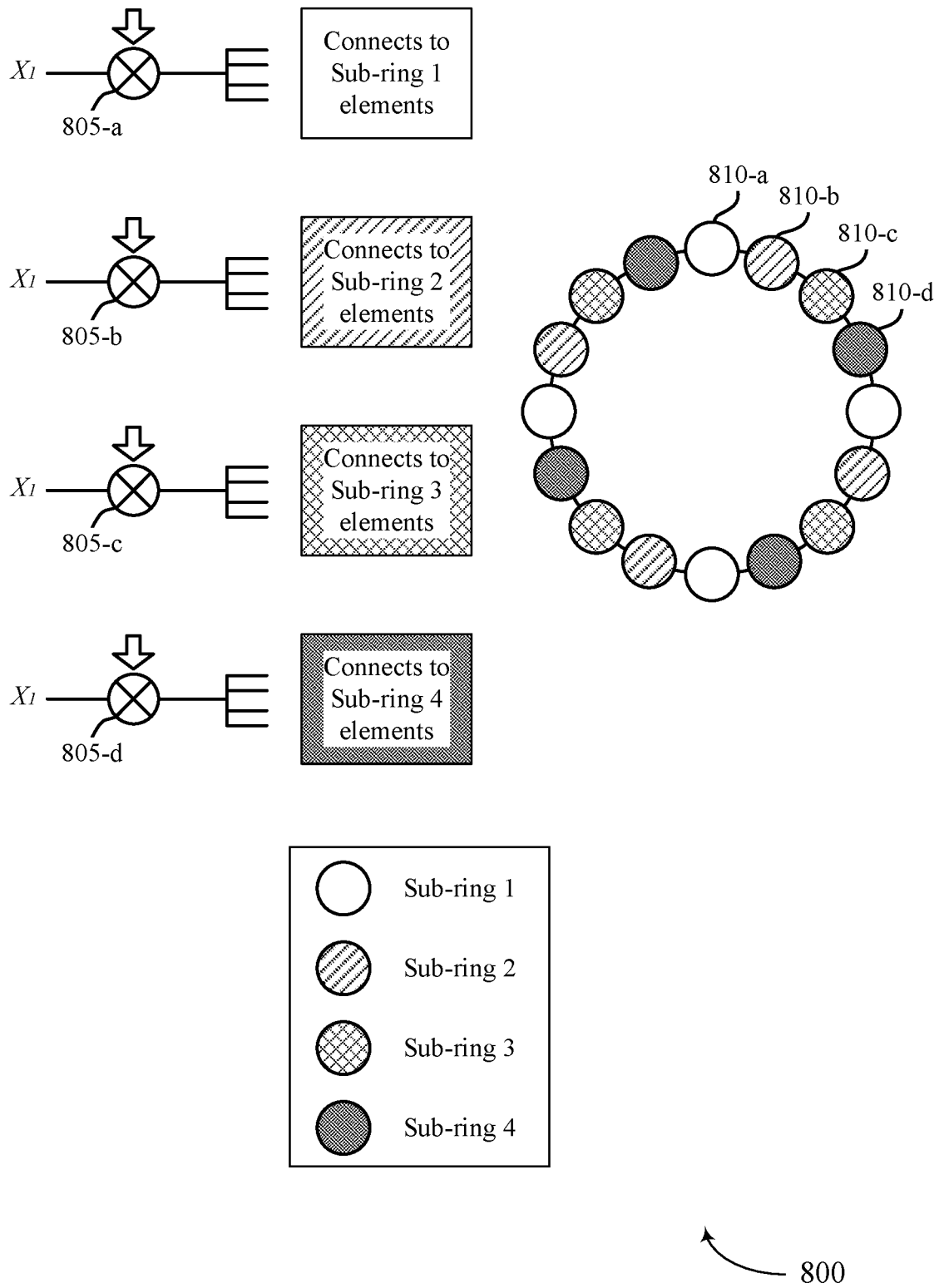

FIG. 8 illustrates an example of a UCA antenna ring configuration 800 that supports OAM communication with variable antenna number in accordance with aspects of the present disclosure. In some examples, the UCA antenna ring configuration 800 may implement aspects of wireless communications systems 100 or 200. In this example, a transmitting device or a receiving device (e.g., a base station or a UE) may implement UCA antenna ring configuration 800.

The UCA antenna ring configuration includes components for different data streams $x_N$ (e.g., $x_1$, $x_2$, $x_3$, and $x_4$) which may be associated with different generation weights 805-*a*, 80-*b*, 805-*c*, and 805-*d*, for an OAM base and an OAM mode associated with different sub-ring elements of the UCA antenna ring configuration 800 (e.g., sub-ring antenna elements 810-*a*, 810-*b*, 810-*c*, and 810-*d*). In some examples, the number of OAM modes may impact the relation between different data streams $x_1$, $x_2$, $x_3$, and $x_4$. For example, the relationship between the number of OAM modes and $X_N$ is given by table 2:

TABLE 2

| Number of OAM modes | Relation among $x_1$, $x_2$, $x_3$, $x_4$ |
|---|---|
| Number of OAM modes M' = 1 (base = 16) | $x_1 = x_2 = x_3 = x_4$ |
| Number of OAM modes M' = 2 (base = 8) | $x_1 = x_3$, $x_2 = x_4$ |
| Number of OAM modes M' = 4 (base = 4) | $x_1$, $x_2$, $x_3$, $x_4$ are independent |

In some examples, the UCA configuration 800 may allow for multiple combinations of sub-rings to transmit a higher-base OAM mode, and may signal the associated OAM base and OAM mode to an OAM receiver. The OAM receiver may receive the indication of the OAM mode and may receive the OAM communications using a corresponding number of antenna elements. In such cases, the OAM receiver may not need to estimate channel gains and or inter-ring precoding/combining weights. For example, with multiple comb-pattern sub-rings, no matter whether the sub-rings are used separately or jointly, the precoding weight vector is an OAM beam weight (e.g., a DFT vector), which the OAM receiver may determine without extensive measurement. This leads to shorter latency and less radio resource overhead.

Additionally or alternatively, the UCA configuration 800 (which includes multiple sub-rings) may have a common large Tx ring radius relative to other devices in the wireless system, which may improve the OAM multiplexing degree.

Figure 9:
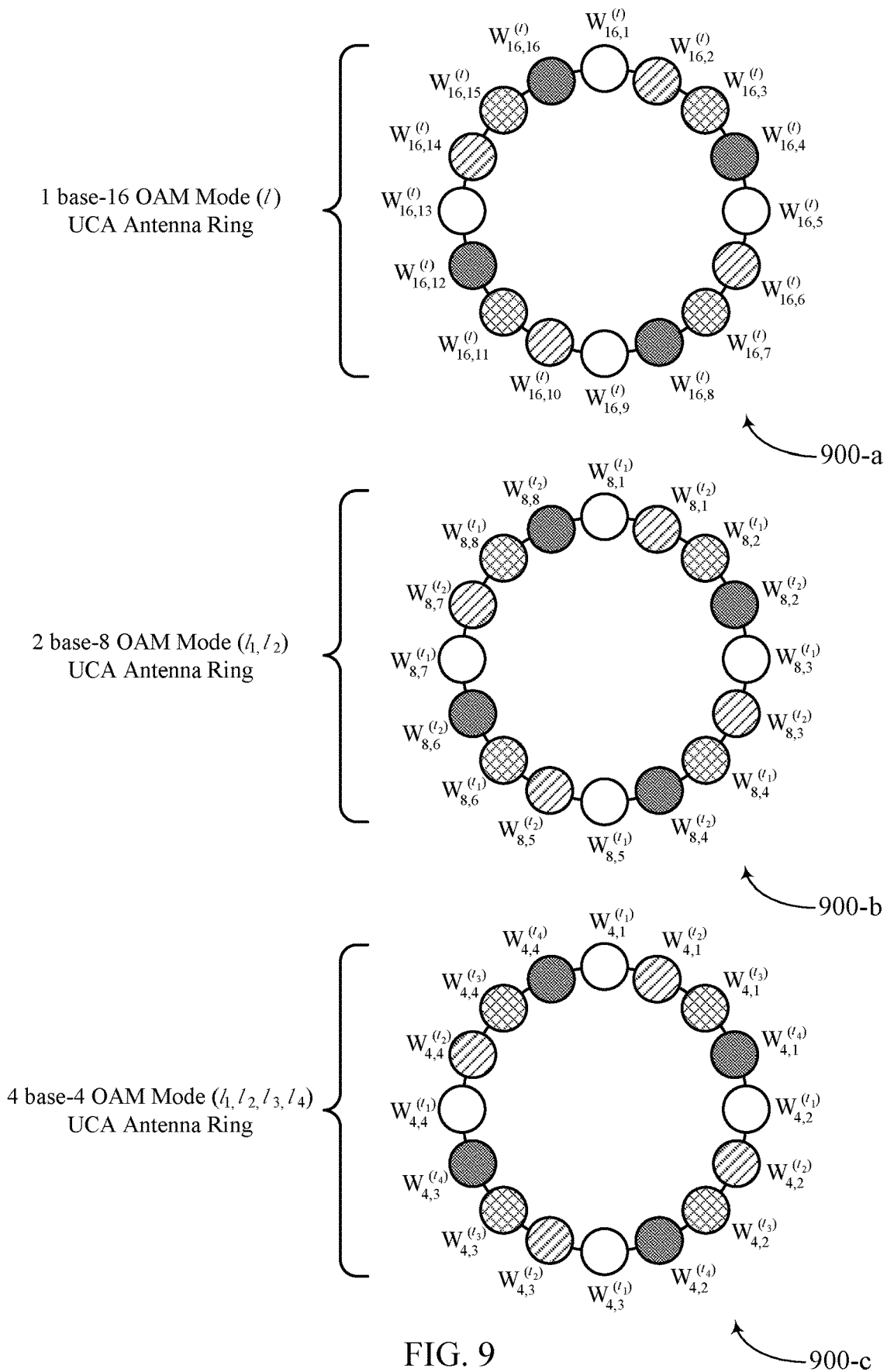
FIG. 9 illustrates an example of UCA precoding configurations that support OAM communication with variable antenna number in accordance with aspects of the present disclosure.

FIG. 9 illustrates an example of a UCA precoding configurations 900 that supports OAM communication with variable antenna number in accordance with aspects of the present disclosure. In some examples, the UCA precoding configuration 900 may implement aspects of wireless communications systems 100 or 200. In some examples, the UCA precoding configurations 900 may implement aspects of UCA configurations 700 or 800. In this example, a transmitting device or a receiving device (e.g., a base station or a UE) may implement UCA precoding configuration 900.

To support OAM communications using a variable antenna number using multiple sub-rings of an OAM antenna ring, a UCA ring may include different antenna precoding weights based on a selected OAM mode. For example, in UCA precoding configuration 900-*a* may be associated with a base-16 OAM mode, with precoding weights corresponding to l:

$$w_{16}^{(l)} = \left[1, e^{j\frac{2\pi l}{16}}, e^{j\frac{2\pi l \cdot 2}{16}}, \ldots, e^{j\frac{2\pi l \cdot 15}{16}}\right],$$

may be applied or multiplied onto all of the antennas in the OAM ring (e.g., all sub-rings of the OAM ring may be multiplied by the precoding weights.

UCA precoding configuration 900-*b* may be associated with a base-8 OAM mode, with precoding weights corresponding to l:

$$w_8^{(l)} = \left[1, e^{j\frac{2\pi l}{8}}, e^{j\frac{2\pi l \cdot 2}{8}}, \ldots, e^{j\frac{2\pi l \cdot 7}{8}}\right]$$

may be applied to or multiplied onto the antennas in a group of two sub-rings.

UCA precoding configuration 900-*c* may be associated with a base-4 OAM mode, with precoding weights corresponding to $$w_4^{(l)} = \left[1, e^{j\frac{2\pi l}{4}}, e^{j\frac{2\pi l \cdot 2}{4}}, \ldots, e^{j\frac{2\pi l \cdot 3}{4}}\right]$$

may be applied or multiplied onto the antennas in a single sub-ring. In any UCA precoding configuration 900, w may be represented as $$w_{n,m}^{(l)} = e^{j\frac{2\pi l(m-1)}{n}}.$$

Figure 10:
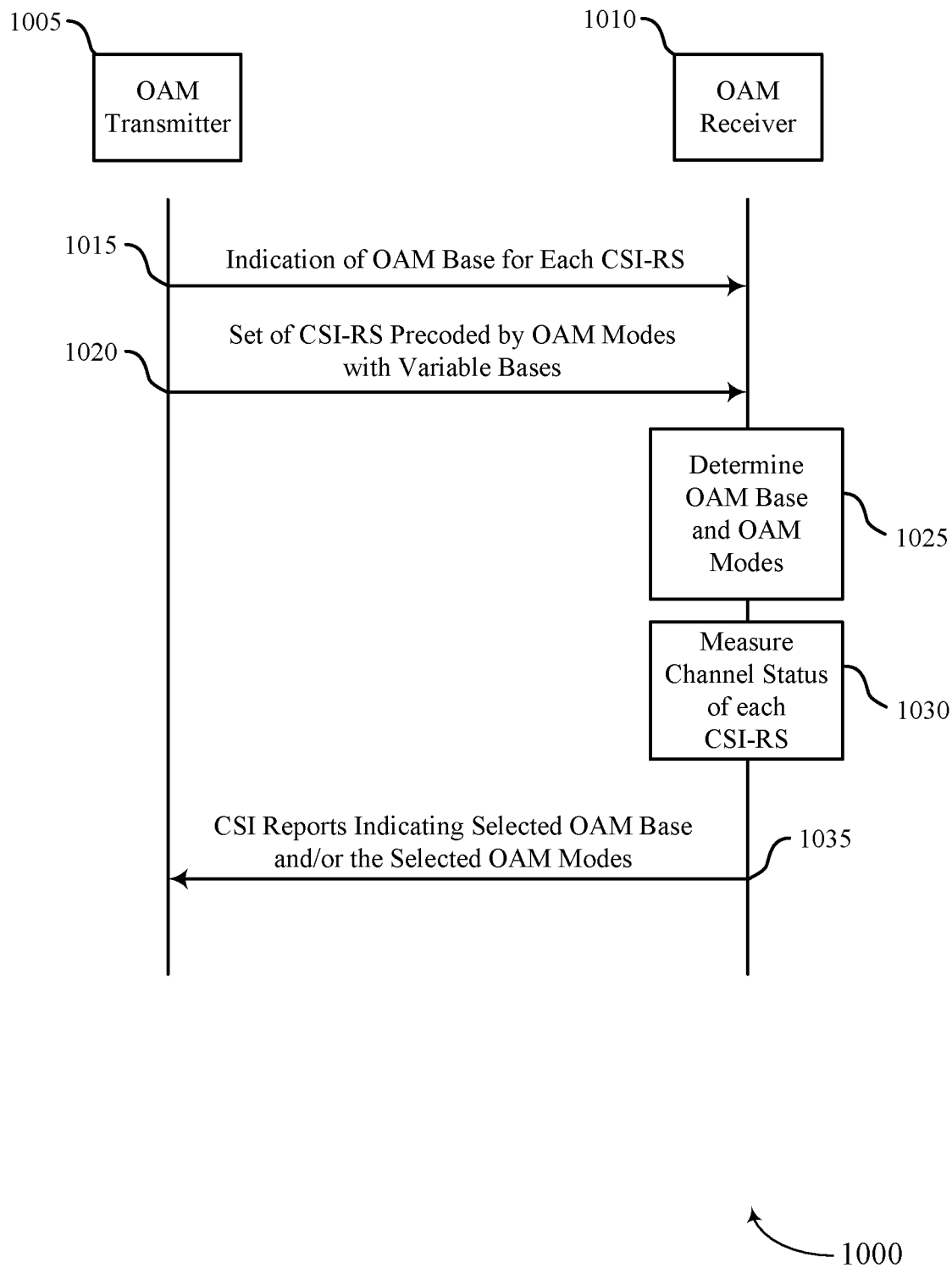
FIG. 10 illustrates an example of a process flow that supports OAM communication with variable antenna number in accordance with aspects of the present disclosure.

FIG. 10 illustrates an example of a process flow 1000 that supports OAM communication with variable antenna number in accordance with aspects of the present disclosure. The process flow 1000 may implement aspects of wireless communications systems 100 and 200, or may be implemented by aspects of the wireless communications system 100 and 200. For example, the process flow 1000 may illustrate operations between an OAM transmitter 1005 and an OAM receiver 1010 which may further be examples of a UE and a base station, two base stations, or two UEs, which may be examples of corresponding devices described with reference to FIGS. 1 and 2. In the following description of the process flow 1000, the operations between the OAM transmitter 1005 and the OAM receiver 1010 may be transmitted in a different order than the example order shown, or the operations may be performed in different orders or at different times or by different devices. Additionally or alternatively, some operations may also be omitted from the process flow 1000, and other operations may be added to the process flow 1000.

In some examples, the OAM transmitter 1005 and the OAM receiver 1010 may communicate CSI signaling (e.g., CSI-RSs and corresponding CSI reporting) using different OAM modes using variable antenna number at the devices. In such cases, the number of receive antenna elements used by the OAM receiver 1010 may be equal to the number of transmit antenna elements used by the OAM transmitter 1005 such that the spatially multiplexed OAM modes are orthogonal.

To determine the OAM modes used for communicating with the OAM receiver 1010, at 1015, the OAM transmitter 1005 may transmit, to the OAM receiver 1010, an indication of the OAM base used for each CSI-RS (e.g., resource or resource set) the OAM transmitter 1005 may transmit to the OAM receiver 1010.

At 1020, the OAM transmitter 1005 may transmit, to the OAM receiver 1010, a set of CSI-RS, each of which is precoded by an OAM mode. In some examples, each OAM mode may have variable OAM bases (e.g., corresponding to a variable number of Tx antennas used), and the OAM transmitter 1005 may transmit the CSI-RSs using one or more Tx sub-rings of the UCA antenna ring.

At 1025, the OAM 1010 receiver may use one or more Rx sub-rings of a UCA antenna ring to receive the CSI-RSs transmitted from the OAM transmitter 1005, and may determine the OAM base and the OAM modes used for transmission of the CSI-RSs. The Rx sub-rings used by the OAM receiver 1010 may make the total number of antenna elements within the Rx sub-rings equal to the OAM base of each corresponding received CSI-RS. In some examples, if a physical downlink shared channel (PDSCH) is associated with a received CSI-RS, the OAM receiver 1010 may determine the correct number of antenna elements to receive this PDSCH.

At 1030, the OAM receiver 1010 may perform channel status measurements for each CSI-RS, and at 1035 the OAM receiver 1010 may transmit, to the OAM transmitter 1005, one or more CSI reports. In some examples, the OAM receiver 1010 may report the channel statuses of all CSI-RSs. Additionally or alternatively, the OAM receiver 1010 may select an OAM base and report channel statuses of all CSI-RSs with this OAM base. In such examples, to reduce the overhead, OAM receiver 1010 may indicate the selected OAM base information (OBI) (e.g., instead of selected CSI-RS resource identifier (CRI)).

For example, if the OAM transmitter 1005 transmits seven CSI-RSs with OAM bases {16,8,8,4,4,4,4}, the OAM receiver 1010 may report OAM base=16 and the channel gain of CSI-RS {1}, or OAM base=8 and the channel gains of CSI-RS {2,3}, or OAM base=4 and the channel gains of CSI-RS {4,5,6,7}.

At 1035, the OAM receiver 1010 may transmit the CSI reports including the selected OAM base, the selected OAM modes, or both, to the OAM transmitter 1005.

In cases that the OAM transmitter 1005 and OAM receiver 1010 are located a spatially short distance away from one another, the channel statues of multiple OAM modes may be similar for both devices. In such cases, the devices may simultaneously transmit multiple OAM modes to obtain higher throughput. To achieve simultaneous transmission, the OAM transmitter 1005 and the OAM receiver 1010 may determine to use multiple sub-rings to transmit multiple OAM modes separately (e.g., for achieving a high degree of spatial multiplexing for the multiple OAM modes). In some other cases that the OAM transmitter 1005 and the OAM receiver 1010 are spatially distant, the channel statues of multiple OAM modes may be different from one another (e.g., one OAM mode may have a higher channel status relative to other OAM modes). In such cases, the OAM transmitter 1005 may transmit one or more of the OAM modes with high channel status to obtain higher throughput. As such, the OAM devices may determine to use multiple sub-rings of the OAM antenna ring to jointly transmit one or more of OAM modes for a low degree of spatial multiplexing.

Additionally or alternatively, the OAM transmitter 1005 and the OAM receiver 1010 may implement techniques described herein for the communication of additional signaling. For example, the OAM transmitter 1005 may determine OAM bases of SSBs to transmit to the OAM receiver 1010, and the OAM receiver 1010 may use the correct number of antenna elements to receive SSBs based on the OAM bases indicated by the OAM transmitter 1005. The OAM transmitter 1005 may transmit an indication of the OAM bases to the OAM receiver 1010, and the OAM receiver 1010 may adjust a number of receive antennas in order to receive SSBs with reduced inter-mode interference (e.g., in cases when the OAM transmitter 1015 transmits multiple SSBs with spatial division multiplexing (SDM) or an identical radio resource, among other examples).

In some other implementations, the OAM transmitter 1005 may be an example of a primary node that configures OAM bases that the OAM receiver 1010 (e.g., a secondary node) may use for transmitting SRSs. The OAM transmitter 1005 may transmit the configured number of OAM bases to the OAM receiver 1010 and the OAM receiver may use the configured number of OAM bases (associated with a number of antenna elements or sub-rings of the OAM antenna ring) to transmit SRS signaling to the OAM transmitter 1005. The OAM transmitter 1005 may use the same number of antenna elements to receive SRSs, for example, in cases where the OAM receiver 1010 transmits multiple SRSs with SDM (e.g., with an identical radio resource) to reduce inter-mode interference. In some other examples, if the OAM receiver 1010 determines that a physical uplink shared channel (PUSCH) is associated with an SRS having a configured OAM base value, the OAM receiver 1010 may determine a correct number of antenna elements to transmit this PUSCH using the configured OAM base.

Figure 11:
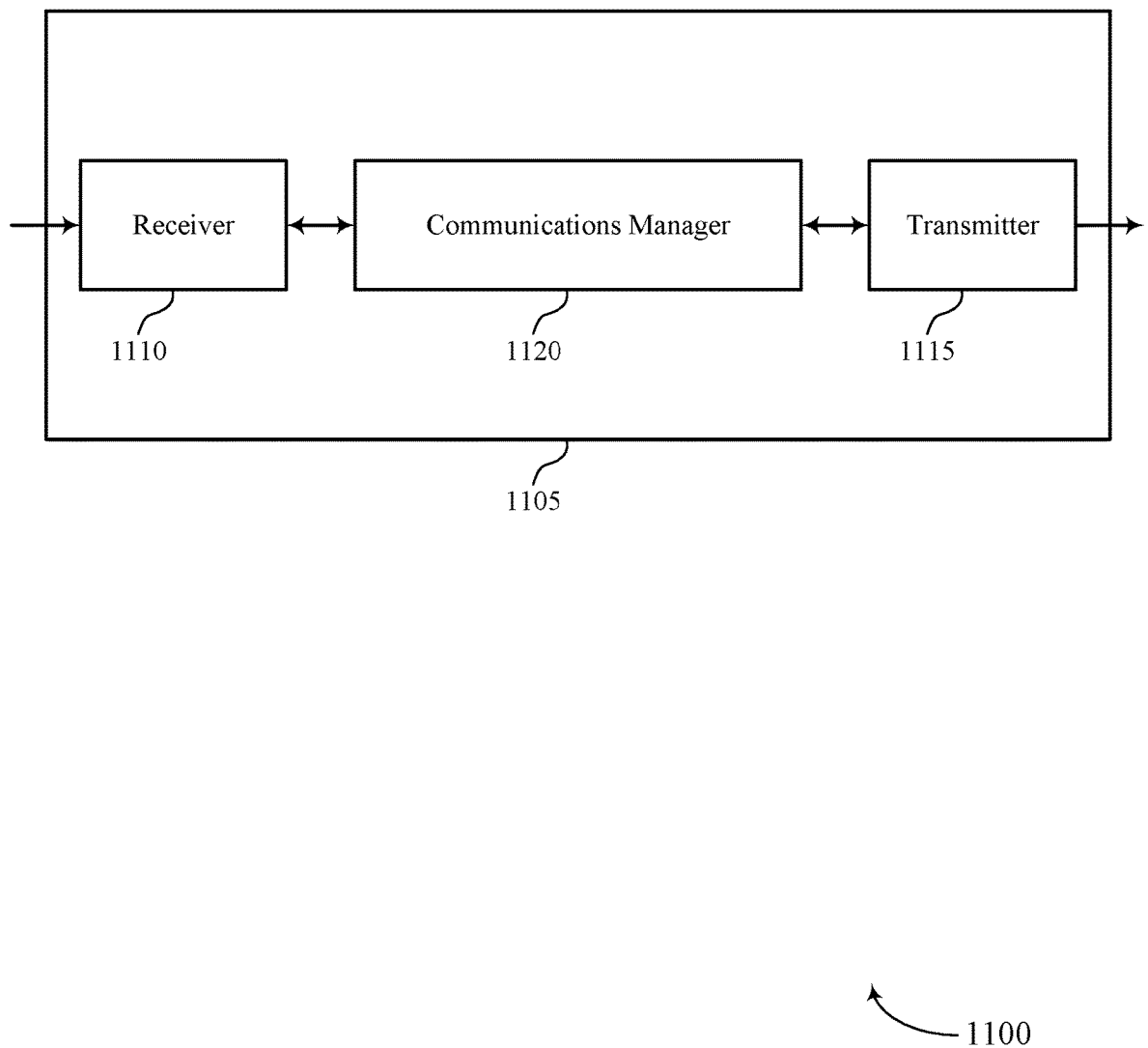
FIGS. 11 and 12 show block diagrams of devices that support OAM communication with variable antenna number in accordance with aspects of the present disclosure.

FIG. 11 shows a block diagram 1100 of a device 1105 that supports OAM communication with variable antenna number in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to OAM communication with variable antenna number). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to OAM communication with variable antenna number). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of OAM communication with variable antenna number as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a first wireless node in accordance with examples as disclosed herein. For example, the communications manager 1120 may be configured as or otherwise support a means for transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The communications manager 1120 may be configured as or otherwise support a means for communicating, with the second wireless node, one or more reference signals according to the one or more OAM modes using the number of antenna elements of the antenna ring based on the OAM base value.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, more efficient utilization of communication resources, increased device coordination, and increased spectral efficiency.

Figure 12:
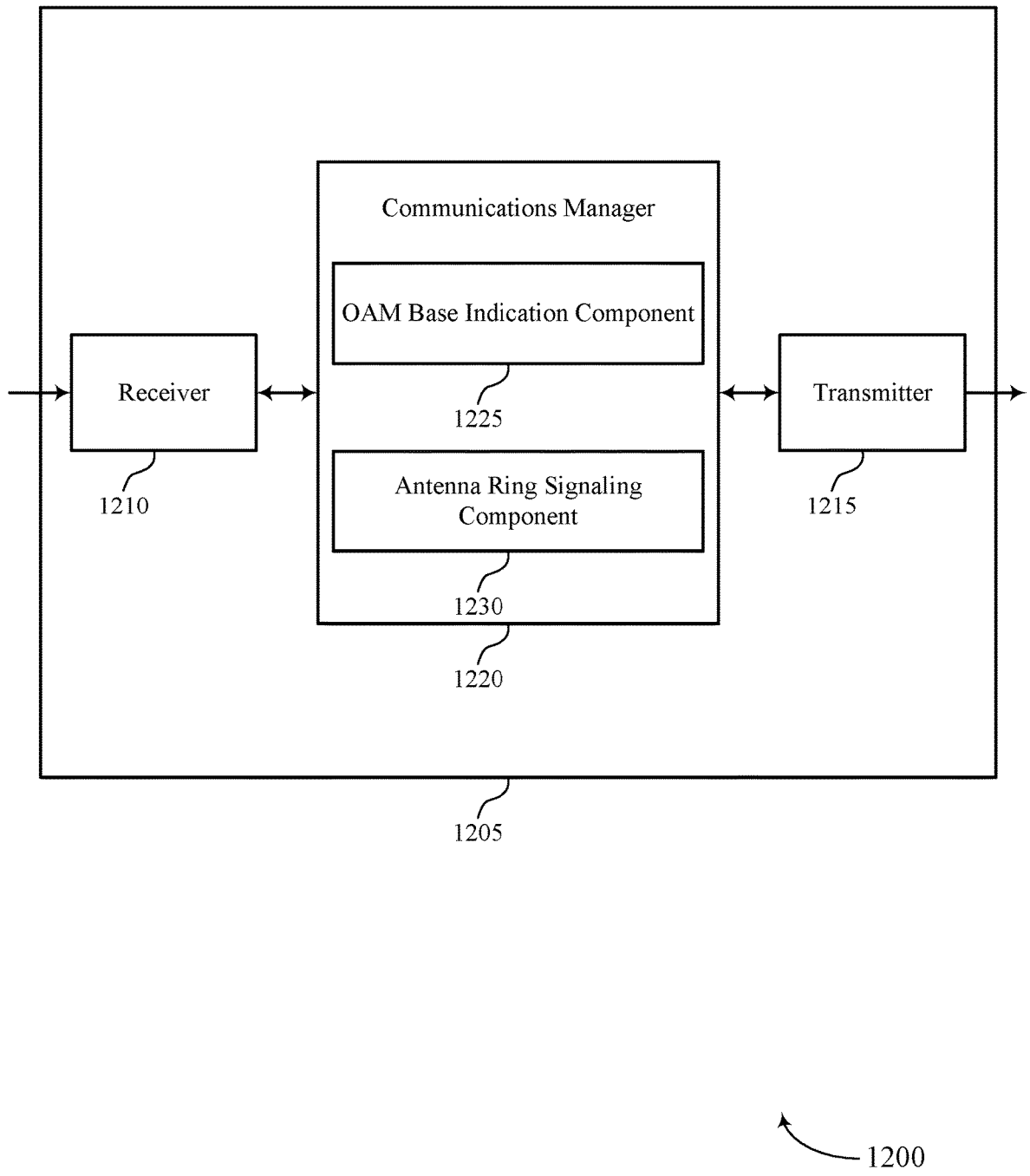

FIG. 12 shows a block diagram 1200 of a device 1205 that supports OAM communication with variable antenna number in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to OAM communication with variable antenna number). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to OAM communication with variable antenna number). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of OAM communication with variable antenna number as described herein. For example, the communications manager 1220 may include a OAM base indication component 1225 an antenna ring signaling component 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a first wireless node in accordance with examples as disclosed herein. The OAM base indication component 1225 may be configured as or otherwise support a means for transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The antenna ring signaling component 1230 may be configured as or otherwise support a means for communicating, with the second wireless node, one or more reference signals according to the one or more OAM modes using the number of antenna elements of the antenna ring based on the OAM base value.

Figure 13:
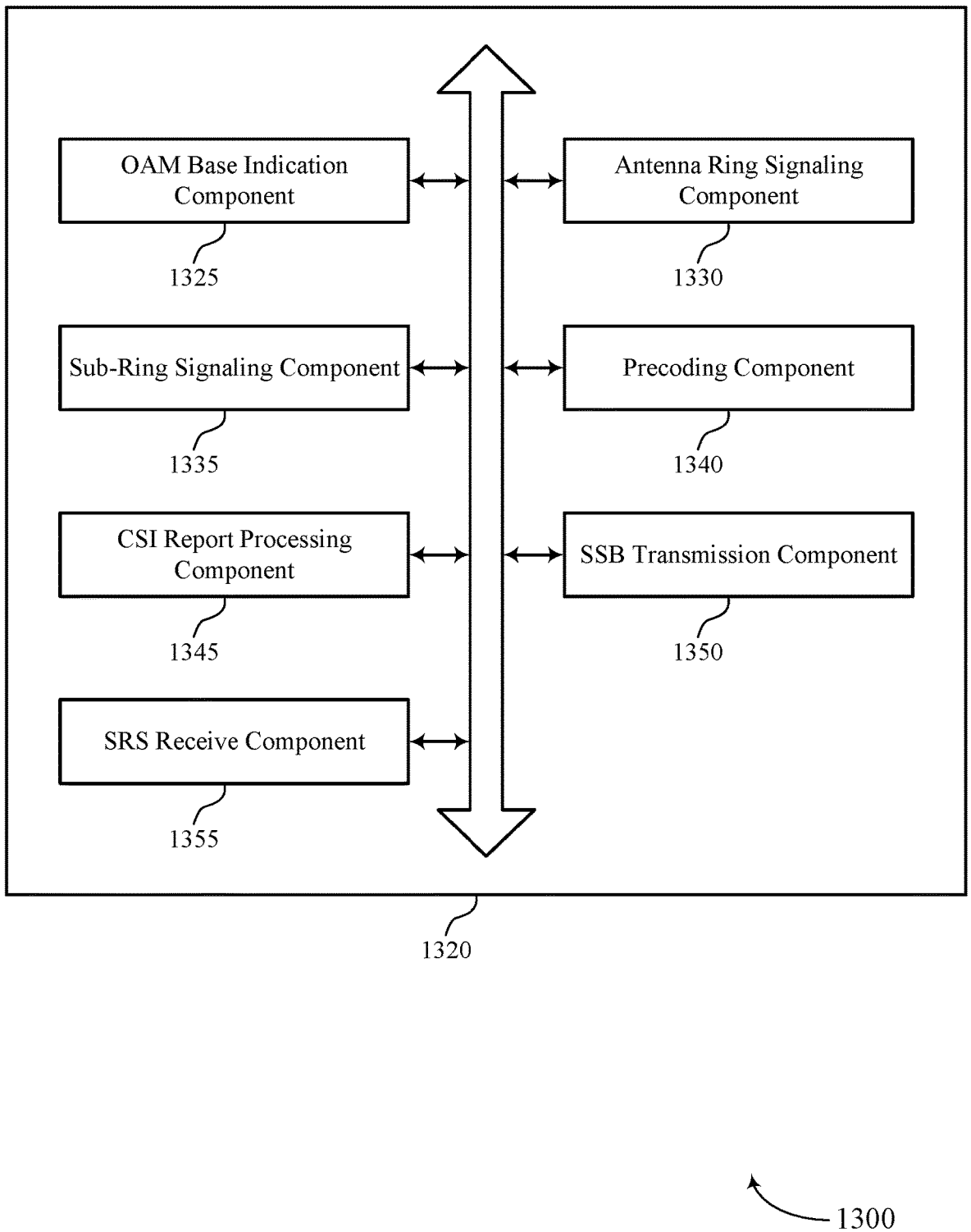
FIG. 13 shows a block diagram of a communications manager that supports OAM communication with variable antenna number in accordance with aspects of the present disclosure.

FIG. 13 shows a block diagram 1300 of a communications manager 1320 that supports OAM communication with variable antenna number in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of OAM communication with variable antenna number as described herein. For example, the communications manager 1320 may include a OAM base indication component 1325, an antenna ring signaling component 1330, a sub-ring signaling component 1335, a precoding component 1340, a CSI report processing component 1345, an SSB transmission component 1350, an SRS receive component 1355, or any combination thereof. Each of these components may communicate, directly or indirectly, with one another (e.g., via one or more buses).

The communications manager 1320 may support wireless communications at a first wireless node in accordance with examples as disclosed herein. The OAM base indication component 1325 may be configured as or otherwise support a means for transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The antenna ring signaling component 1330 may be configured as or otherwise support a means for communicating, with the second wireless node, one or more reference signals according to the one or more OAM modes using the number of antenna elements of the antenna ring based on the OAM base value.

In some examples, communicating the one or more reference signals using one or more sub-rings of the antenna ring, where each sub-ring of the one or more sub-rings is associated with a respective OAM mode of the one or more OAM modes.

In some examples, each sub-ring of the one or more sub-rings is associated with a different radio frequency chain for communicating with the second wireless node and a set of the one or more sub-rings includes the number of antenna elements.

In some examples, the precoding component 1340 may be configured as or otherwise support a means for applying, to one or more data streams associated with the one or more reference signals, a set of precoding weights based on the one or more OAM modes and the OAM base value.

In some examples, communicating, with the second wireless node, multiple reference signals according to the one or more OAM modes using one or more sub-rings of the antenna ring, each of the one or more OAM modes corresponding to a respective set of one or more sub-rings of the antenna ring.

In some examples, to support communicating, the sub-ring signaling component 1335 may be configured as or otherwise support a means for transmitting a first instance of the reference signal using a first set of one or more sub-rings of the antenna ring based on a first base value of the set of multiple base values, the first base value indicating a first number of antenna elements for the first set of one or more sub-rings. In some examples, to support communicating, the sub-ring signaling component 1335 may be configured as or otherwise support a means for transmitting a second instance of the reference signal using a second set of one or more sub-rings of the antenna ring based on a second base value of the set of multiple base values, the second base value indicating a second number of antenna elements for the second set of one or more sub-rings.

In some examples, each of the first instance and the second instance includes a channel state information reference signals precoded according to a set of OAM modes corresponding to the first base value and the second base value.

In some examples, the CSI report processing component 1345 may be configured as or otherwise support a means for receiving, from the second wireless node, one or more channel state information reports corresponding to the one or more reference signals, the one or more channel state information reports indicating the OAM base value.

In some examples, the OAM base indication component 1325 may be configured as or otherwise support a means for receiving, from the second wireless node, an indication of the OAM base value selected by the second wireless node, where the indication includes OAM base information. In some examples, the CSI report processing component 1345 may be configured as or otherwise support a means for receiving, from the second wireless node, one or more channel state information reports associated with the OAM base value based on the OAM base information.

In some examples, the OAM base indication component 1325 may be configured as or otherwise support a means for transmitting, to the second wireless node, an indication of one or more OAM base values. In some examples, the SSB transmission component 1350 may be configured as or otherwise support a means for transmitting, to the second wireless node, one or more synchronization signal blocks in accordance with the one or more OAM base values.

In some examples, receiving, from the second wireless node, one or more sounding reference signals in accordance the OAM base value.

In some examples, the OAM base value is selected from a set of OAM base values, each of the set of OAM base values corresponding to a respective number of antenna elements of the antenna ring used for communications with the second wireless node.

Figure 14:
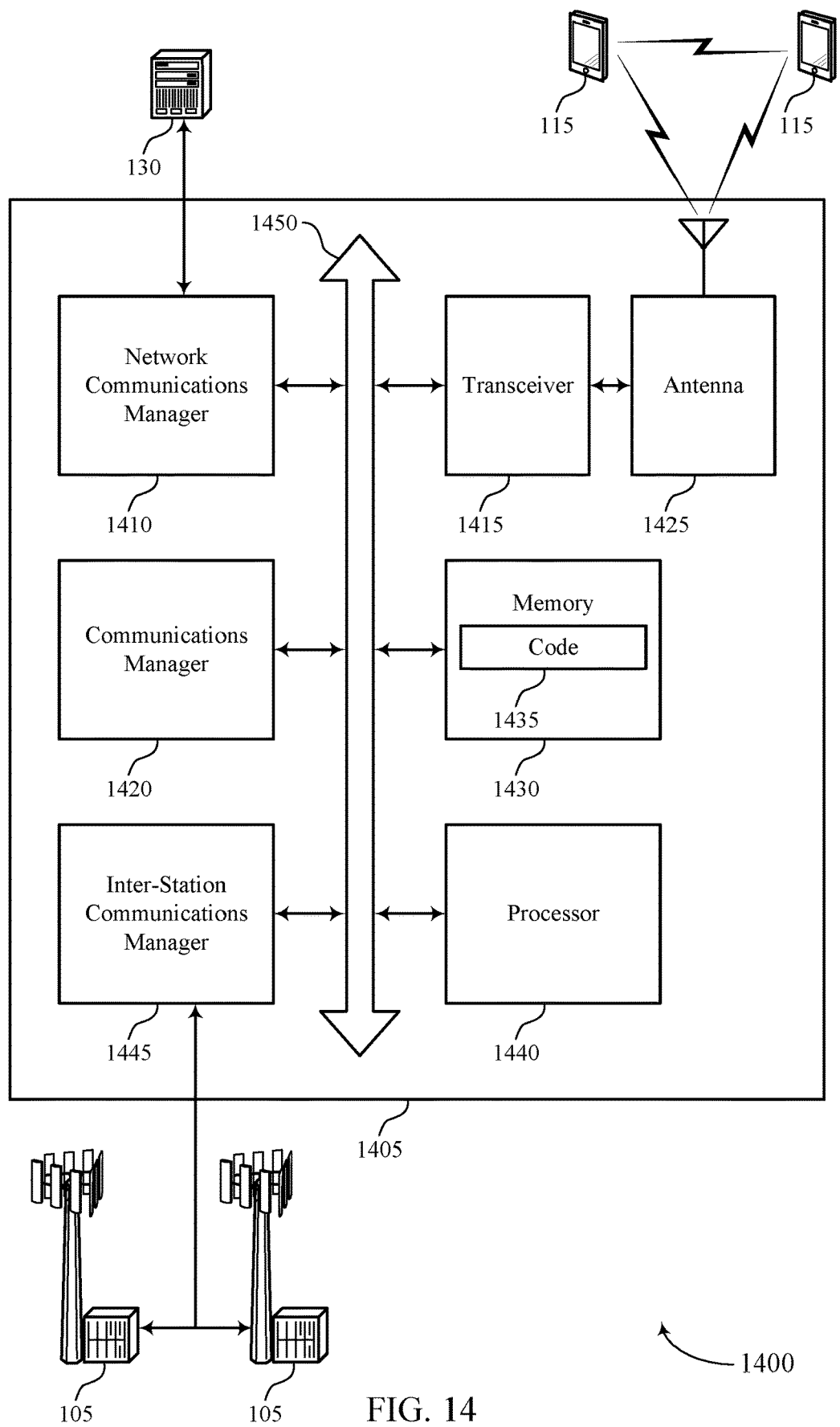
FIG. 14 shows a diagram of a system including a device that supports OAM communication with variable antenna number in accordance with aspects of the present disclosure.

FIG. 14 shows a diagram of a system 1400 including a device 1405 that supports OAM communication with variable antenna number in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting OAM communication with variable antenna number). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a first wireless node in accordance with examples as disclosed herein. For example, the communications manager 1420 may be configured as or otherwise support a means for transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The communications manager 1420 may be configured as or otherwise support a means for communicating, with the second wireless node, one or more reference signals according to the one or more OAM modes using the number of antenna elements of the antenna ring based on the OAM base value.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, improved adaptation to channel status (e.g., high rank or low rank) to achieve high throughput), reduced resource consumption, and increased spectral efficiency.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of OAM communication with variable antenna number as described herein, or the processor 1440 and the memory 1430 may be otherwise configured to perform or support such operations.

Figure 15:
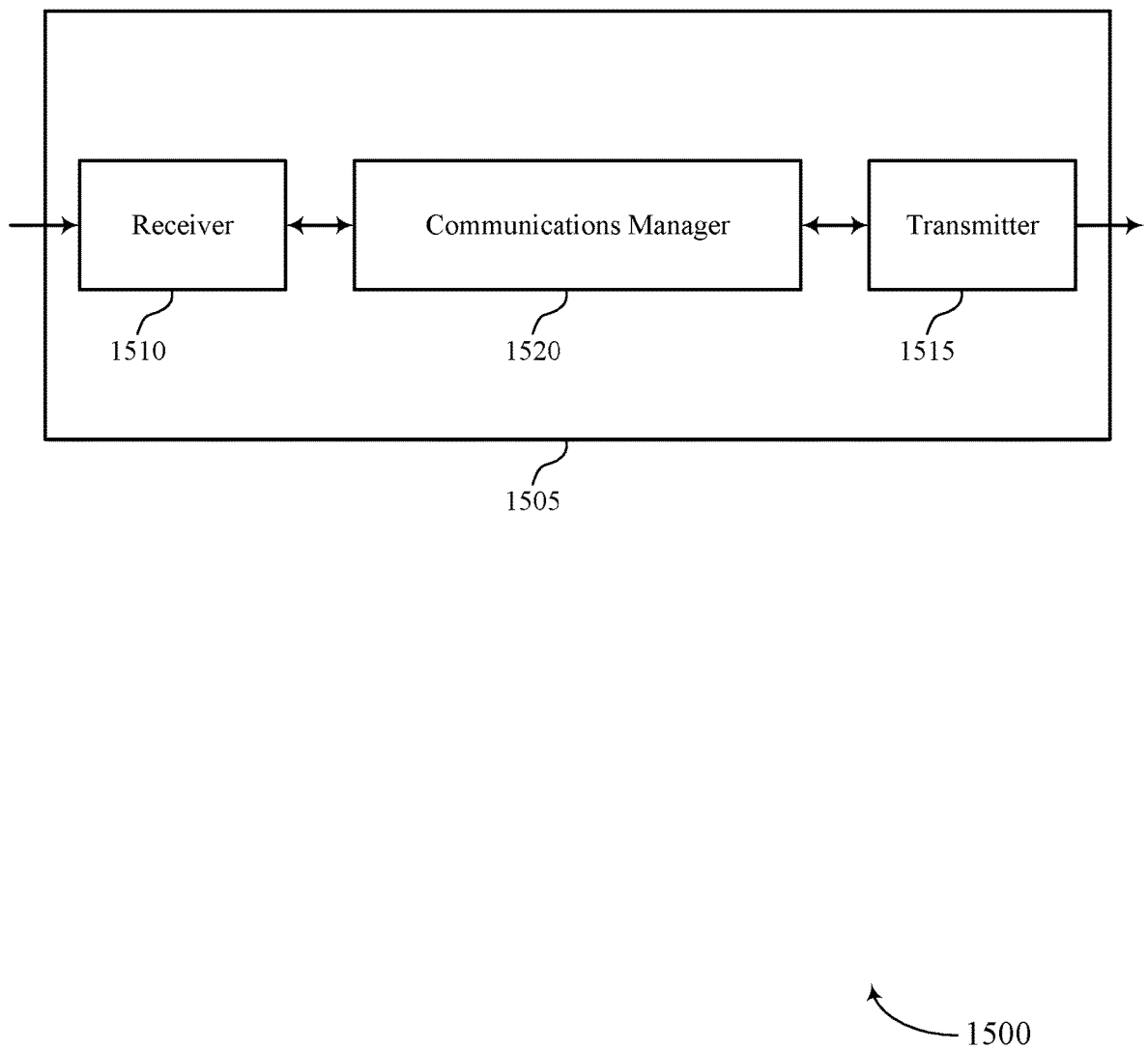
FIGS. 15 and 16 show block diagrams of devices that support OAM communication with variable antenna number in accordance with aspects of the present disclosure.

FIG. 15 shows a block diagram 1500 of a device 1505 that supports OAM communication with variable antenna number in accordance with aspects of the present disclosure. The device 1505 may be an example of aspects of a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to OAM communication with variable antenna number). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to OAM communication with variable antenna number). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of OAM communication with variable antenna number as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a second wireless node in accordance with examples as disclosed herein. For example, the communications manager 1520 may be configured as or otherwise support a means for receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes. The communications manager 1520 may be configured as or otherwise support a means for communicating, with the first wireless node, one or more reference signals according to the one or more OAM modes using the number of antenna elements of the antenna ring based on the OAM base value.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for reduced processing, more efficient utilization of communication resources, increased device coordination, and increased spectral efficiency.

Figure 16:
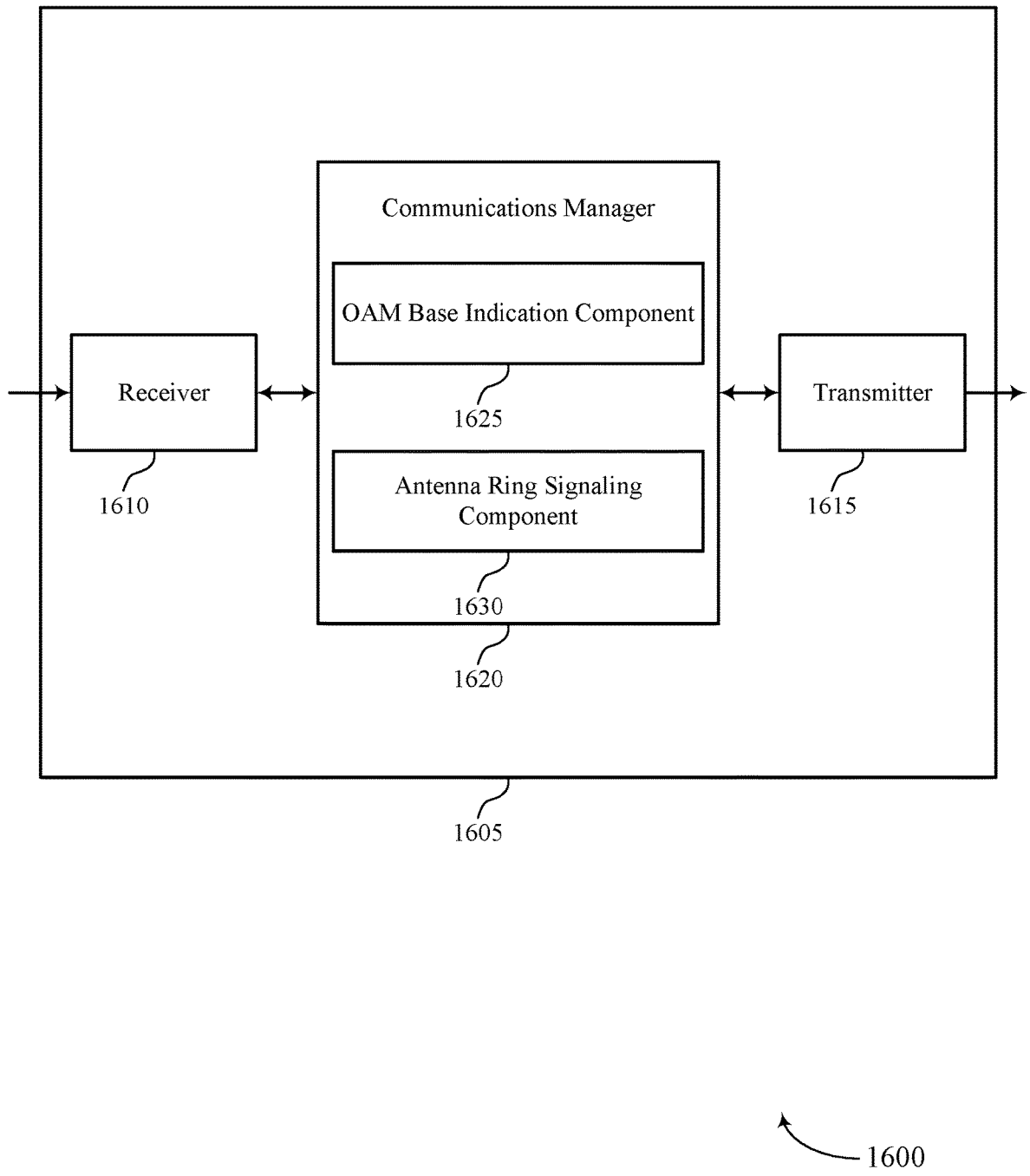

FIG. 16 shows a block diagram 1600 of a device 1605 that supports OAM communication with variable antenna number in accordance with aspects of the present disclosure. The device 1605 may be an example of aspects of a device 1505 or a UE 115 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to OAM communication with variable antenna number). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to OAM communication with variable antenna number). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of OAM communication with variable antenna number as described herein. For example, the communications manager 1620 may include a OAM base indication component 1625 an antenna ring signaling component 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a second wireless node in accordance with examples as disclosed herein. The OAM base indication component 1625 may be configured as or otherwise support a means for receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes. The antenna ring signaling component 1630 may be configured as or otherwise support a means for communicating, with the first wireless node, one or more reference signals according to the one or more OAM modes using the number of antenna elements of the antenna ring based on the OAM base value.

Figure 17:
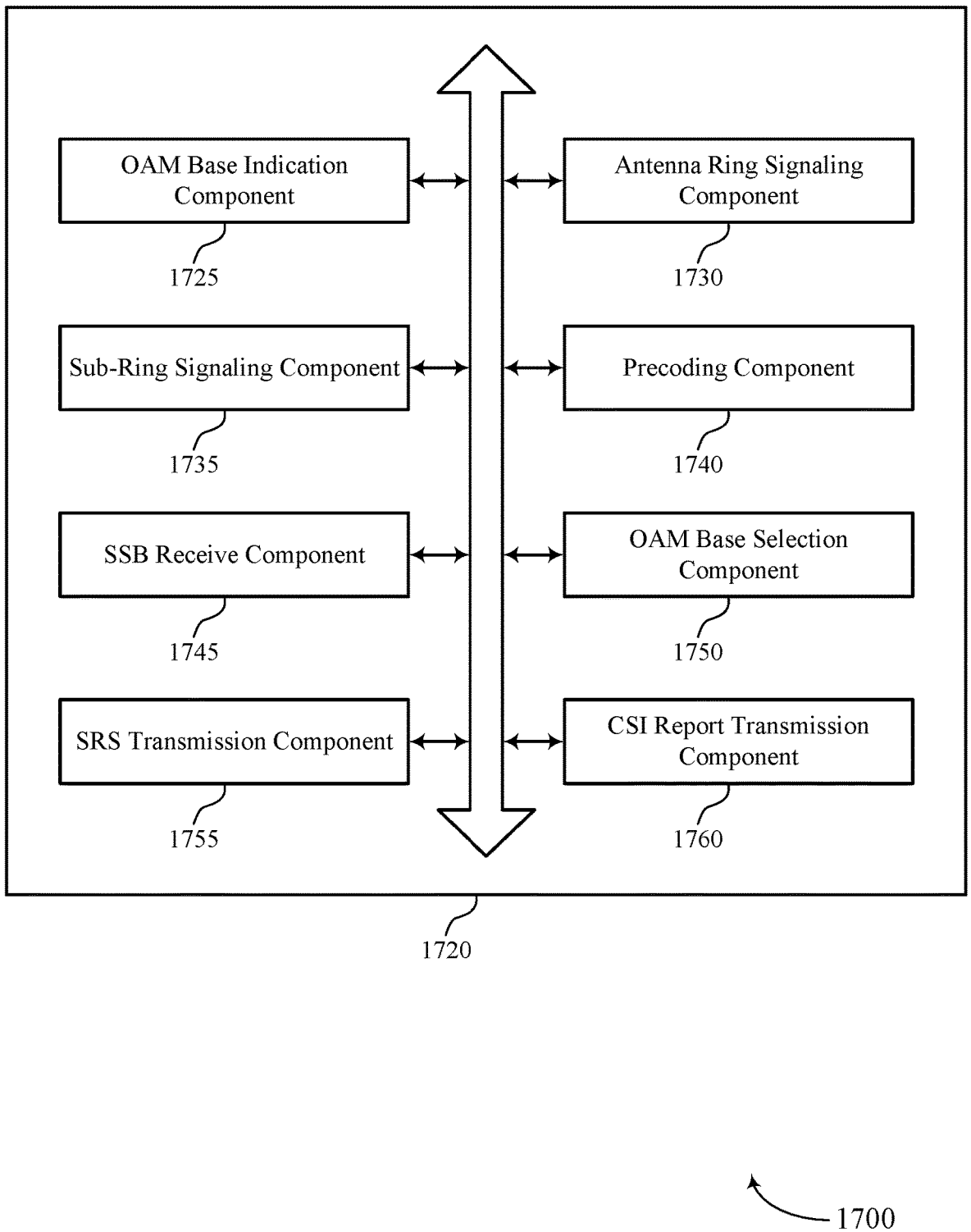
FIG. 17 shows a block diagram of a communications manager that supports OAM communication with variable antenna number in accordance with aspects of the present disclosure.

FIG. 17 shows a block diagram 1700 of a communications manager 1720 that supports OAM communication with variable antenna number in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of OAM communication with variable antenna number as described herein. For example, the communications manager 1720 may include a OAM base indication component 1725, an antenna ring signaling component 1730, a sub-ring signaling component 1735, a precoding component 1740, an SSB receive component 1745, a OAM base selection component 1750, an SRS transmission component 1755, a CSI report transmission component 1760, or any combination thereof. Each of these components may communicate, directly or indirectly, with one another (e.g., via one or more buses).

The communications manager 1720 may support wireless communications at a second wireless node in accordance with examples as disclosed herein. The OAM base indication component 1725 may be configured as or otherwise support a means for receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes. The antenna ring signaling component 1730 may be configured as or otherwise support a means for communicating, with the first wireless node, one or more reference signals according to the one or more OAM modes using the number of antenna elements of the antenna ring based on the OAM base value.

In some examples, communicating the one or more reference signals using one or more sub-rings of the antenna ring, where each sub-ring of the one or more sub-rings is associated with a respective OAM mode of the one or more OAM modes.

In some examples, each sub-ring of the one or more sub-rings is associated with a different radio frequency chain for communicating with the first wireless node and a set of the one or more sub-rings includes the number of antenna elements.

In some examples, the precoding component 1740 may be configured as or otherwise support a means for applying, to one or more data streams associated with the one or more reference signals, a set of precoding weights based on the one or more OAM modes and the OAM base value.

In some examples, communicating, with the first wireless node, multiple reference signals with the first wireless node using according to the one or more OAM modes using one or more sub-rings of the antenna ring, each of the one or more OAM modes corresponding to a respective set of one or more sub-rings of the antenna ring.

In some examples, to support communicating, the sub-ring signaling component 1735 may be configured as or otherwise support a means for receiving a first instance of the reference signal using a first set of one or more sub-rings of the antenna ring based on a first base value of the set of multiple base values, the first base value indicating a first number of antenna elements for the first set of one or more sub-rings. In some examples, to support communicating, the sub-ring signaling component 1735 may be configured as or otherwise support a means for receiving a second instance of the reference signal using a second set of one or more sub-rings of the antenna ring based on a second base value of the set of multiple base values, the second base value indicating a second number of antenna elements for the second set of one or more sub-rings.

In some examples, each of the first instance and the second instance includes a channel state information reference signals precoded according to a set of OAM modes corresponding to the first base value and the second base value.

In some examples, the CSI report transmission component 1760 may be configured as or otherwise support a means for transmitting, to the first wireless node, one or more channel state information reports corresponding to the one or more reference signals, the one or more channel state information reports indicating the OAM base value.

In some examples, the OAM base selection component 1750 may be configured as or otherwise support a means for selecting one or more OAM base values to use for communications with the first wireless node, where the indication includes OAM base information. In some examples, the CSI report transmission component 1760 may be configured as or otherwise support a means for transmitting, to the first wireless node, one or more channel state information reports including an indication of the OAM base information.

In some examples, the OAM base indication component 1725 may be configured as or otherwise support a means for receiving, from the first wireless node, an indication of one or more OAM base values. In some examples, the SSB receive component 1745 may be configured as or otherwise support a means for receiving, from the first wireless node, one or more synchronization signal blocks in accordance with the one or more OAM base values.

In some examples, the OAM base selection component 1750 may be configured as or otherwise support a means for receiving, from the first wireless node, an indication of one or more OAM base values. In some examples, the SRS transmission component 1755 may be configured as or otherwise support a means for transmitting, to the first wireless node, one or more sounding reference signals in accordance with the one or more OAM base values.

In some examples, the OAM base value is selected from a set of OAM base values, each of the set of OAM base values corresponding to a respective number of antenna elements of the antenna ring used for communications with the first wireless node.

Figure 18:
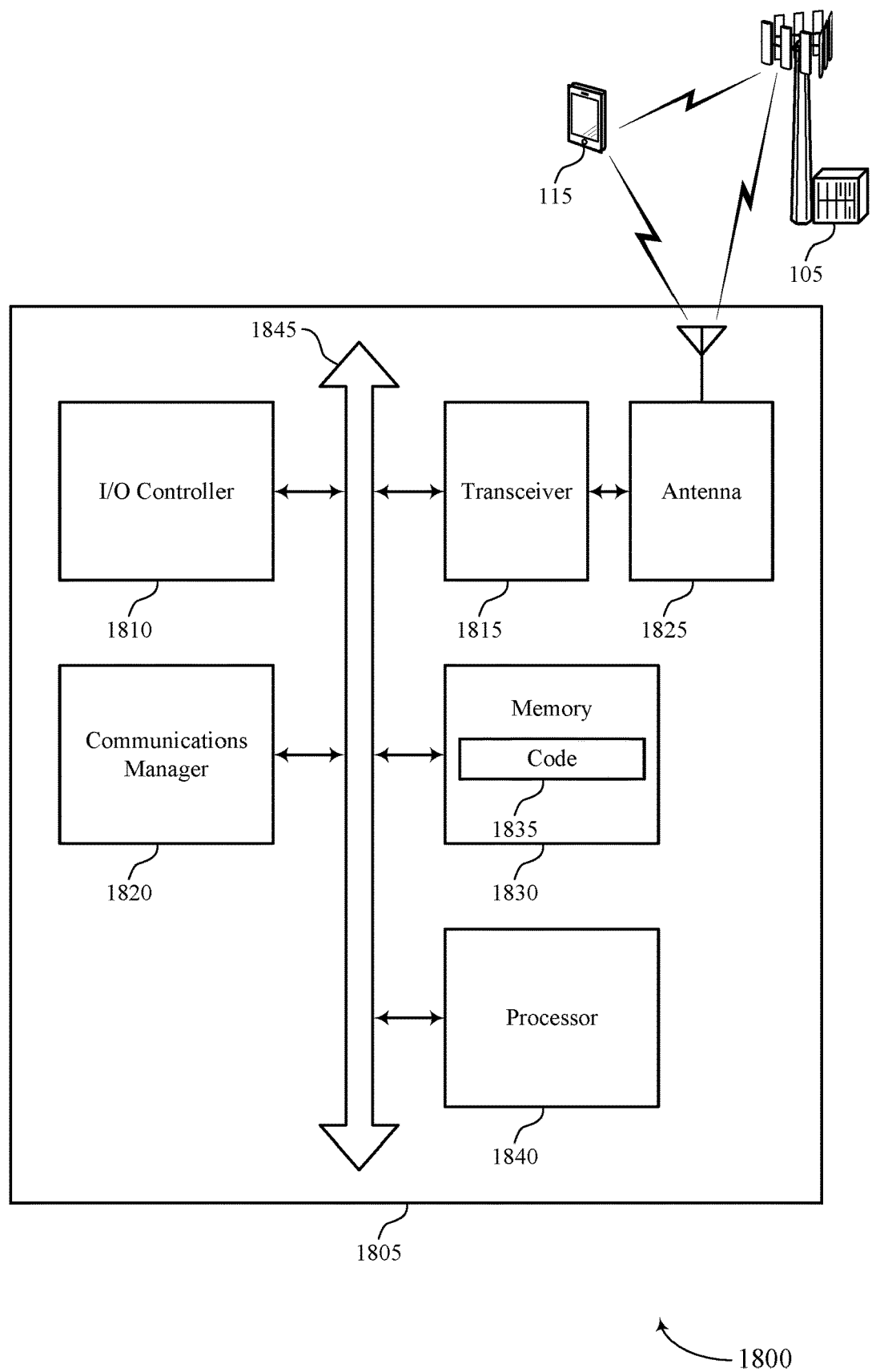
FIG. 18 shows a diagram of a system including a device that supports OAM communication with variable antenna number in accordance with aspects of the present disclosure.

FIG. 18 shows a diagram of a system 1800 including a device 1805 that supports OAM communication with variable antenna number in accordance with aspects of the present disclosure. The device 1805 may be an example of or include the components of a device 1505, a device 1605, or a UE 115 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, an input/output (I/O) controller 1810, a transceiver 1815, an antenna 1825, a memory 1830, code 1835, and a processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally or alternatively, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include random access memory (RAM) and read-only memory (ROM). The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a basic I/O system (BIOS) which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting OAM communication with variable antenna number). For example, the device 1805 or a component of the device 1805 may include a processor 1840 and memory 1830 coupled to the processor 1840, the processor 1840 and memory 1830 configured to perform various functions described herein.

The communications manager 1820 may support wireless communications at a second wireless node in accordance with examples as disclosed herein. For example, the communications manager 1820 may be configured as or otherwise support a means for receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes. The communications manager 1820 may be configured as or otherwise support a means for communicating, with the first wireless node, one or more reference signals according to the one or more OAM modes using the number of antenna elements of the antenna ring based on the OAM base value.

By including or configuring the communications manager 1820 in accordance with examples as described herein, the device 1805 may support techniques for improved communication reliability, reduced latency, improved user experience related to reduced processing, reduced power consumption, more efficient utilization of communication resources, improved coordination between devices, improved adaptation to channel status (e.g., high rank or low rank) to achieve high throughput), reduced resource consumption, and increased spectral efficiency.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of OAM communication with variable antenna number as described herein, or the processor 1840 and the memory 1830 may be otherwise configured to perform or support such operations.

Figure 19:
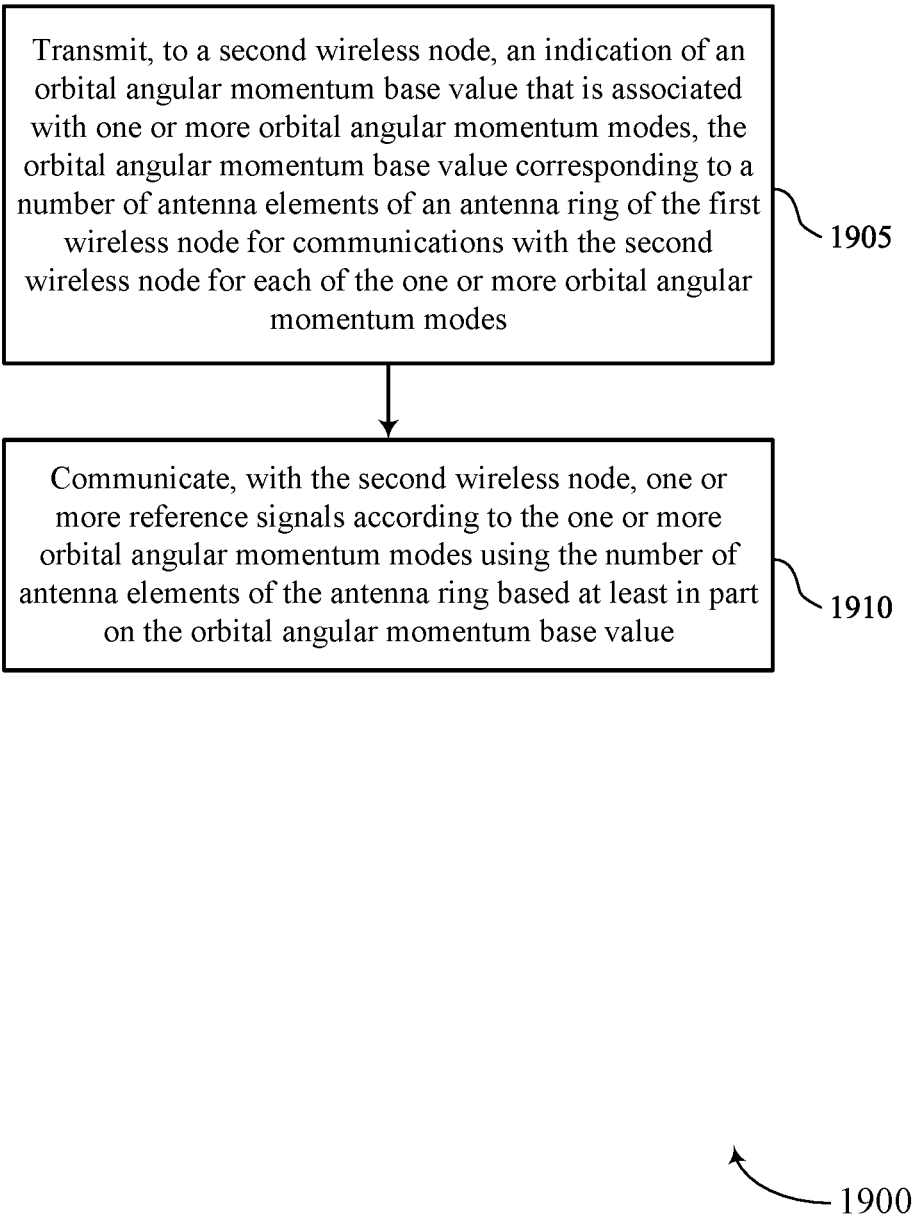
FIGS. 19 through 25 show flowcharts illustrating methods that support OAM communication with variable antenna number in accordance with aspects of the present disclosure.

FIG. 19 shows a flowchart illustrating a method 1900 that supports OAM communication with variable antenna number in accordance with aspects of the present disclosure. The operations of the method 1900 may be implemented by a base station or its components as described herein. For example, the operations of the method 1900 may be performed by a base station 105 as described with reference to FIGS. 1 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 1905 may be performed in accordance with examples as disclosed herein. In some examples, aspects of the operations of 1905 may be performed by a OAM base indication component 1325 as described with reference to FIG. 13.

At 1910, the method may include communicating, with the second wireless node, one or more reference signals according to the one or more OAM modes using the number of antenna elements of the antenna ring based on the OAM base value. The operations of 1910 may be performed in accordance with examples as disclosed herein. In some examples, aspects of the operations of 1910 may be performed by an antenna ring signaling component 1330 as described with reference to FIG. 13.

Figure 20:
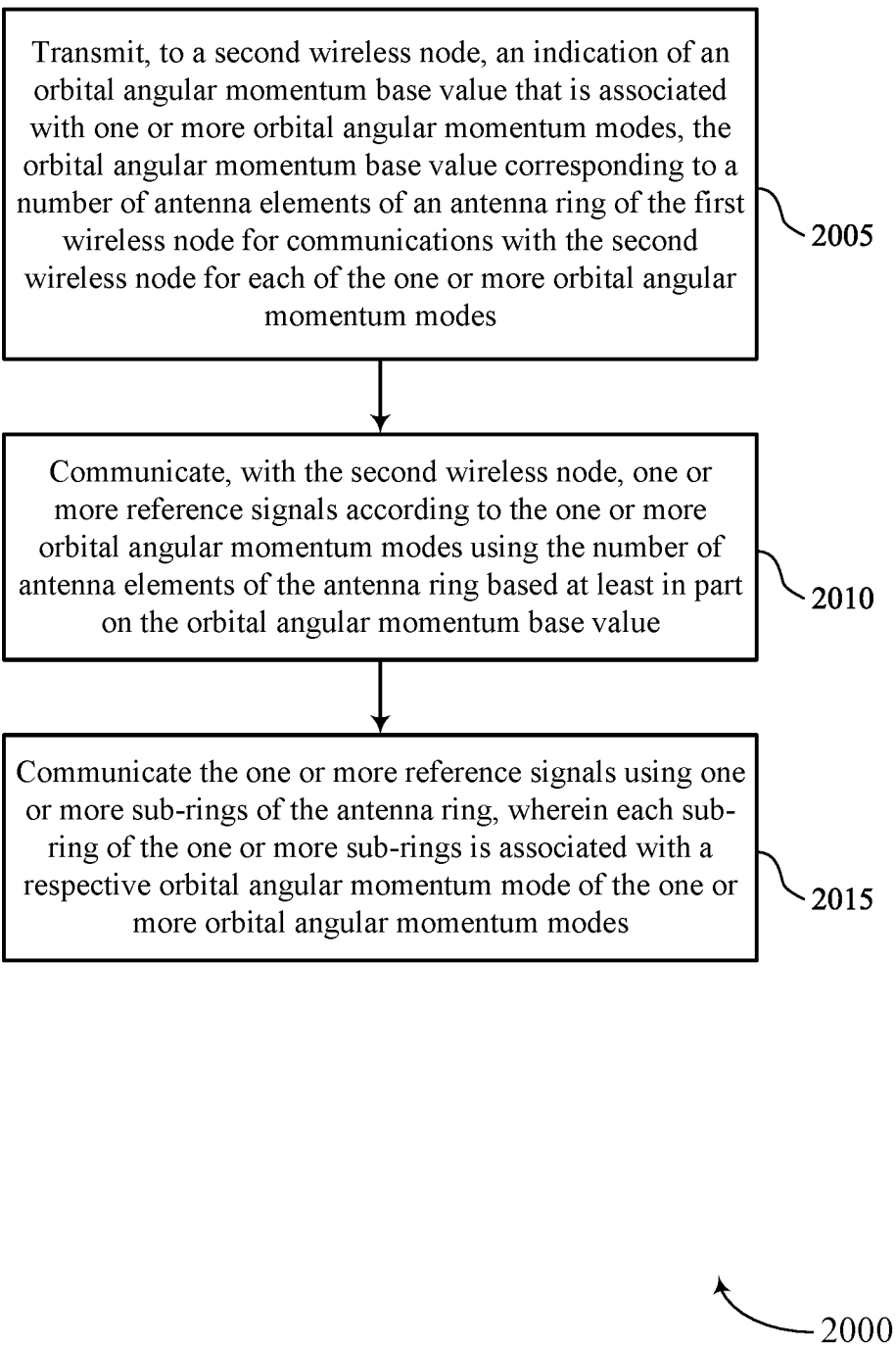

FIG. 20 shows a flowchart illustrating a method 2000 that supports OAM communication with variable antenna number in accordance with aspects of the present disclosure. The operations of the method 2000 may be implemented by a base station or its components as described herein. For example, the operations of the method 2000 may be performed by a base station 105 as described with reference to FIGS. 1 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 2005 may be performed in accordance with examples as disclosed herein. In some examples, aspects of the operations of 2005 may be performed by a OAM base indication component 1325 as described with reference to FIG. 13.

At 2010, the method may include communicating, with the second wireless node, one or more reference signals according to the one or more OAM modes using the number of antenna elements of the antenna ring based on the OAM base value. The operations of 2010 may be performed in accordance with examples as disclosed herein. In some examples, aspects of the operations of 2010 may be performed by an antenna ring signaling component 1330 as described with reference to FIG. 13.

At 2015, the method may include communicating the one or more reference signals using one or more sub-rings of the antenna ring, where each sub-ring of the one or more sub-rings is associated with a respective OAM mode of the one or more OAM modes. The operations of 2015 may be performed in accordance with examples as disclosed herein. In some examples, aspects of the operations of 2015 may be performed by a sub-ring signaling component 1335 as described with reference to FIG. 13.

Figure 21:
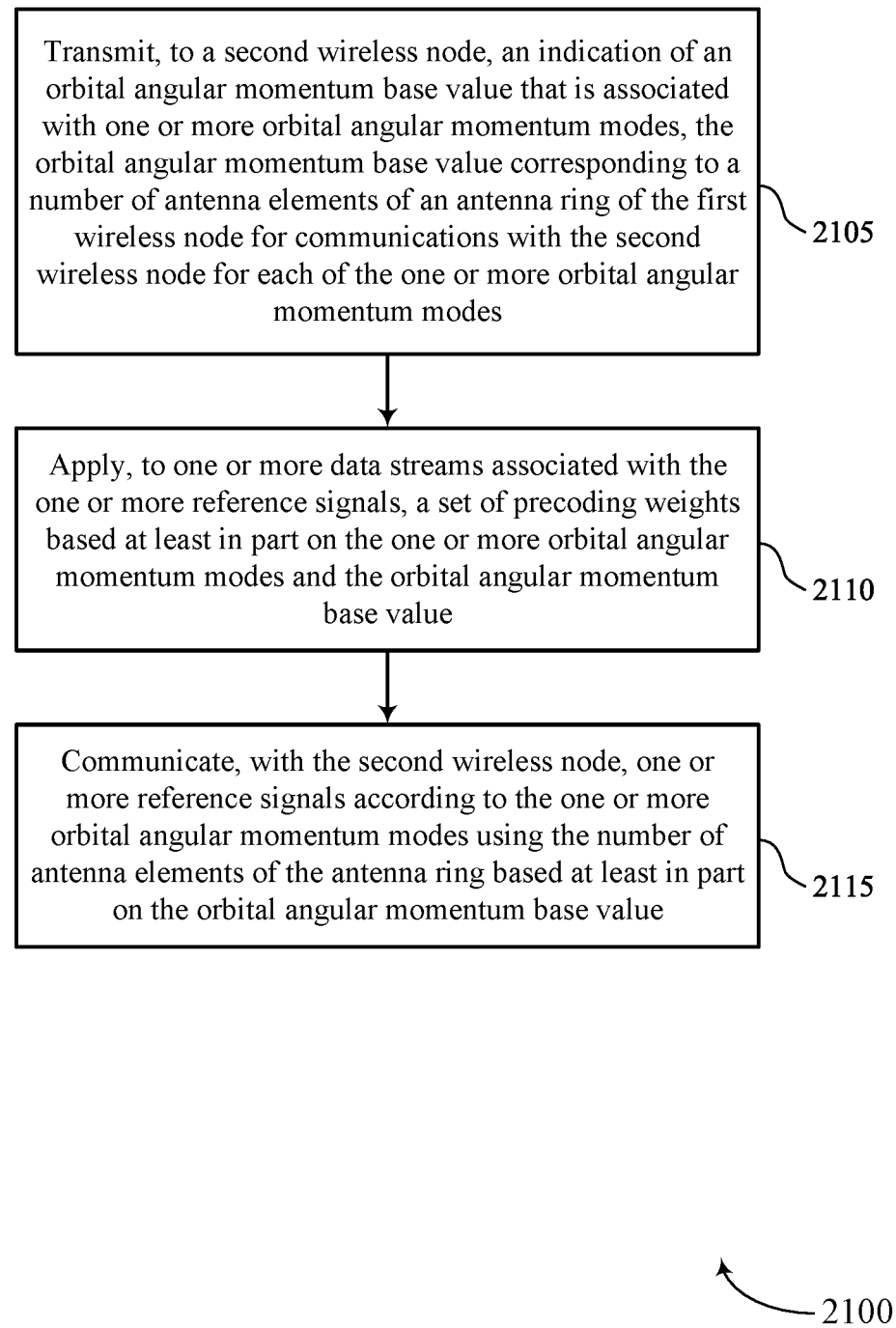

FIG. 21 shows a flowchart illustrating a method 2100 that supports OAM communication with variable antenna number in accordance with aspects of the present disclosure. The operations of the method 2100 may be implemented by a base station or its components as described herein. For example, the operations of the method 2100 may be performed by a base station 105 as described with reference to FIGS. 1 through 14. In some examples, a base station may execute a set of instructions to control the functional elements of the base station to perform the described functions. Additionally or alternatively, the base station may perform aspects of the described functions using special-purpose hardware.

At 2105, the method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 2105 may be performed in accordance with examples as disclosed herein. In some examples, aspects of the operations of 2105 may be performed by a OAM base indication component 1325 as described with reference to FIG. 13.

At 2110, the method may include applying, to one or more data streams associated with the one or more reference signals, a set of precoding weights based on the one or more OAM modes and the OAM base value. The operations of 2110 may be performed in accordance with examples as disclosed herein. In some examples, aspects of the operations of 2110 may be performed by a precoding component 1340 as described with reference to FIG. 13.

At 2115, the method may include communicating, with the second wireless node, one or more reference signals according to the one or more OAM modes using the number of antenna elements of the antenna ring based on the OAM base value. The operations of 2115 may be performed in accordance with examples as disclosed herein. In some examples, aspects of the operations of 2115 may be performed by an antenna ring signaling component 1330 as described with reference to FIG. 13.

Figure 22:
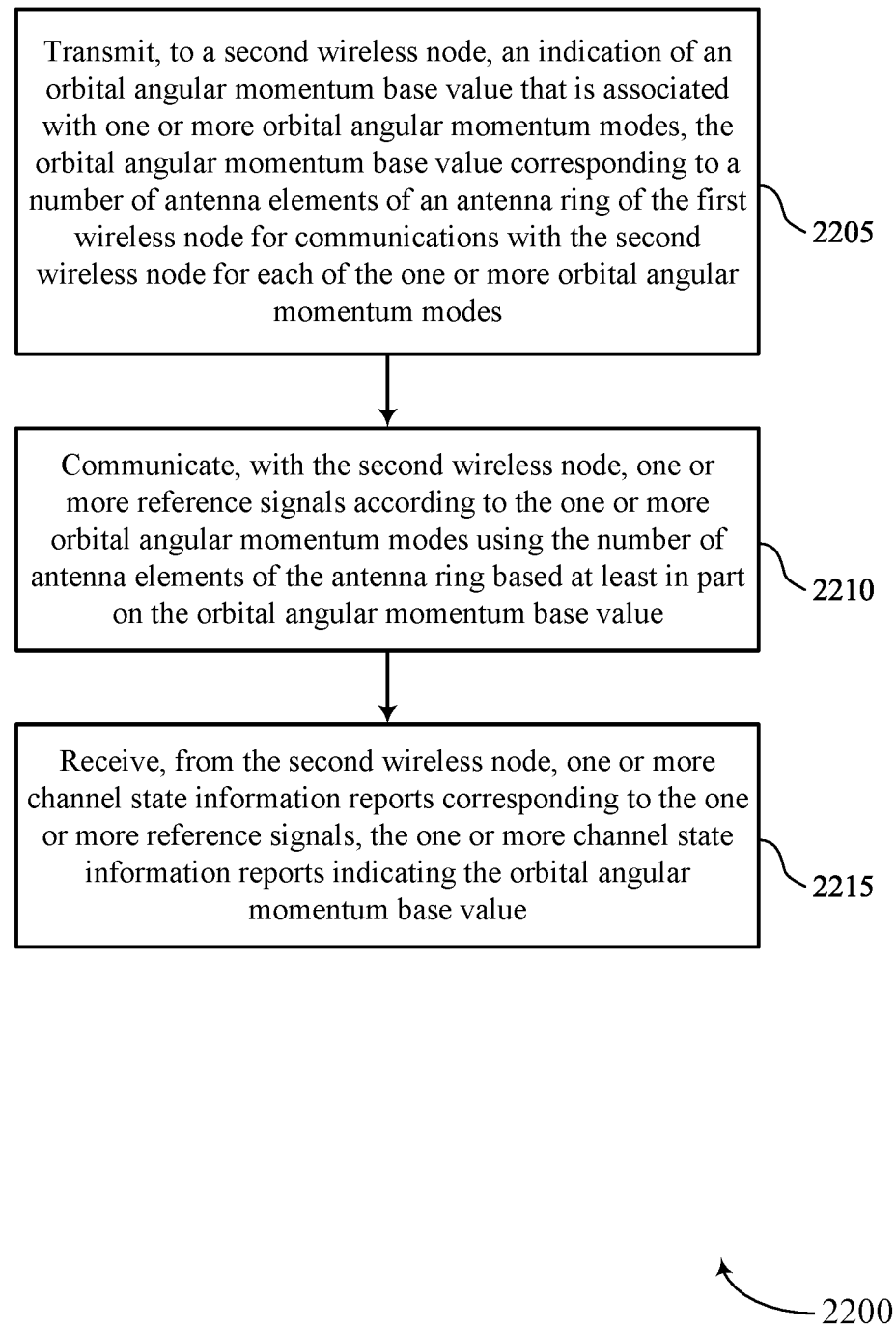

FIG. 22 shows a flowchart illustrating a method 2200 that supports OAM communication with variable antenna number in accordance with aspects of the present disclosure. The operations of the method 2200 may be implemented by a base station or its components as described herein. For example, the operations of the method 2200 may be performed by a base station 105 as described with reference to FIGS. 1 through 14. In some examples, a base station may execute a set of instructions to control the functional elements of the base station to perform the described functions. Additionally or alternatively, the base station may perform aspects of the described functions using special-purpose hardware.

At 2205, the method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 2205 may be performed in accordance with examples as disclosed herein. In some examples, aspects of the operations of 2205 may be performed by a OAM base indication component 1325 as described with reference to FIG. 13.

At 2210, the method may include communicating, with the second wireless node, one or more reference signals according to the one or more OAM modes using the number of antenna elements of the antenna ring based on the OAM base value. The operations of 2210 may be performed in accordance with examples as disclosed herein. In some examples, aspects of the operations of 2210 may be performed by an antenna ring signaling component 1330 as described with reference to FIG. 13.

At 2215, the method may include receiving, from the second wireless node, one or more channel state information reports corresponding to the one or more reference signals, the one or more channel state information reports indicating the OAM base value. The operations of 2215 may be performed in accordance with examples as disclosed herein. In some examples, aspects of the operations of 2215 may be performed by a CSI report processing component 1345 as described with reference to FIG. 13.

Figure 23:
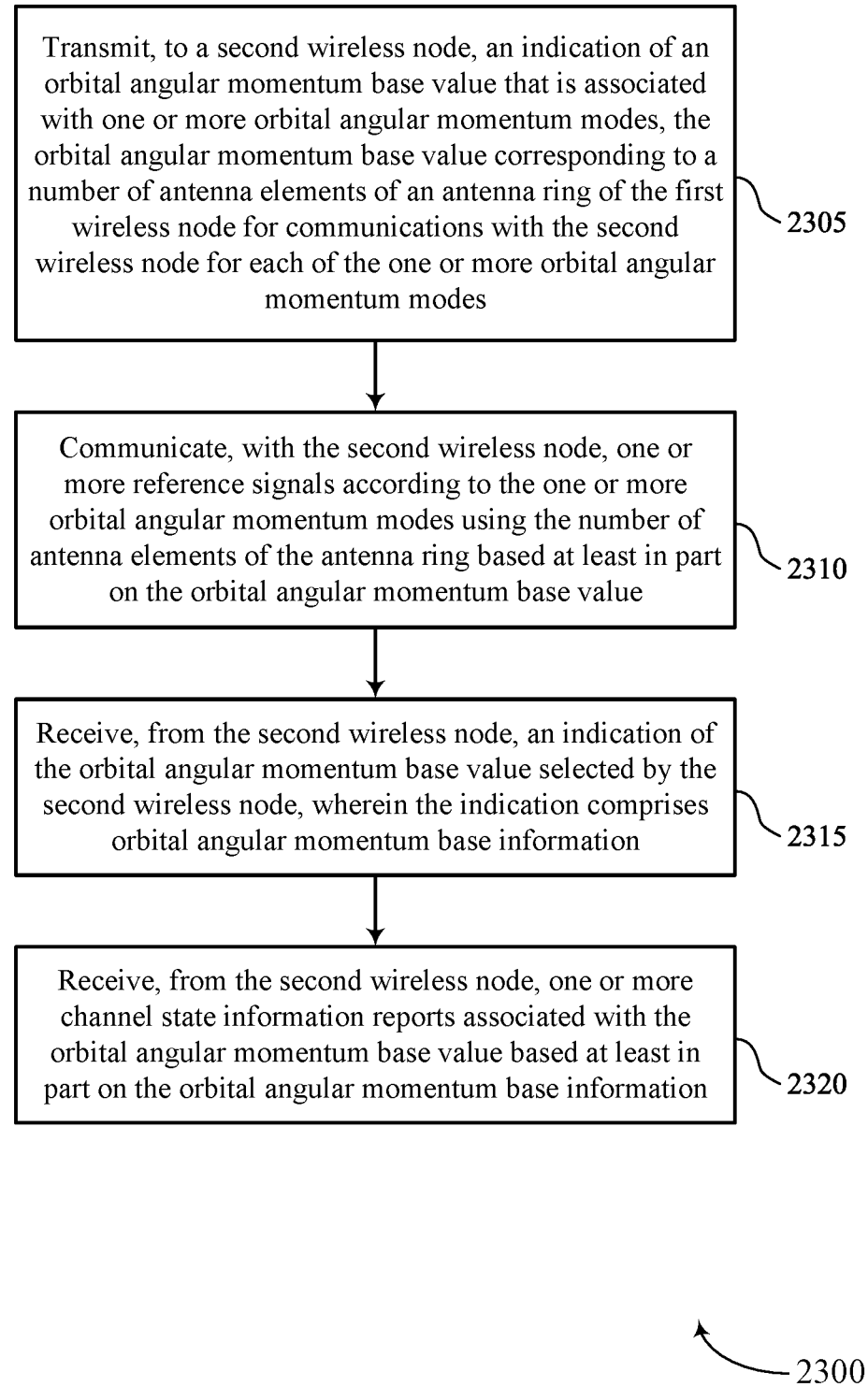

FIG. 23 shows a flowchart illustrating a method 2300 that supports OAM communication with variable antenna number in accordance with aspects of the present disclosure. The operations of the method 2300 may be implemented by a base station or its components as described herein. For example, the operations of the method 2300 may be performed by a base station 105 as described with reference to FIGS. 1 through 14. In some examples, a base station may execute a set of instructions to control the functional elements of the base station to perform the described functions. Additionally or alternatively, the base station may perform aspects of the described functions using special-purpose hardware.

At 2305, the method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 2305 may be performed in accordance with examples as disclosed herein. In some examples, aspects of the operations of 2305 may be performed by a OAM base indication component 1325 as described with reference to FIG. 13.

At 2310, the method may include communicating, with the second wireless node, one or more reference signals according to the one or more OAM modes using the number of antenna elements of the antenna ring based on the OAM base value. The operations of 2310 may be performed in accordance with examples as disclosed herein. In some examples, aspects of the operations of 2310 may be performed by an antenna ring signaling component 1330 as described with reference to FIG. 13.

At 2315, the method may include receiving, from the second wireless node, an indication of the OAM base value selected by the second wireless node, where the indication includes OAM base information. The operations of 2315 may be performed in accordance with examples as disclosed herein. In some examples, aspects of the operations of 2315 may be performed by a OAM base indication component 1325 as described with reference to FIG. 13.

At 2320, the method may include receiving, from the second wireless node, one or more channel state information reports associated with the OAM base value based on the OAM base information. The operations of 2320 may be performed in accordance with examples as disclosed herein. In some examples, aspects of the operations of 2320 may be performed by a CSI report processing component 1345 as described with reference to FIG. 13.

Figure 24:
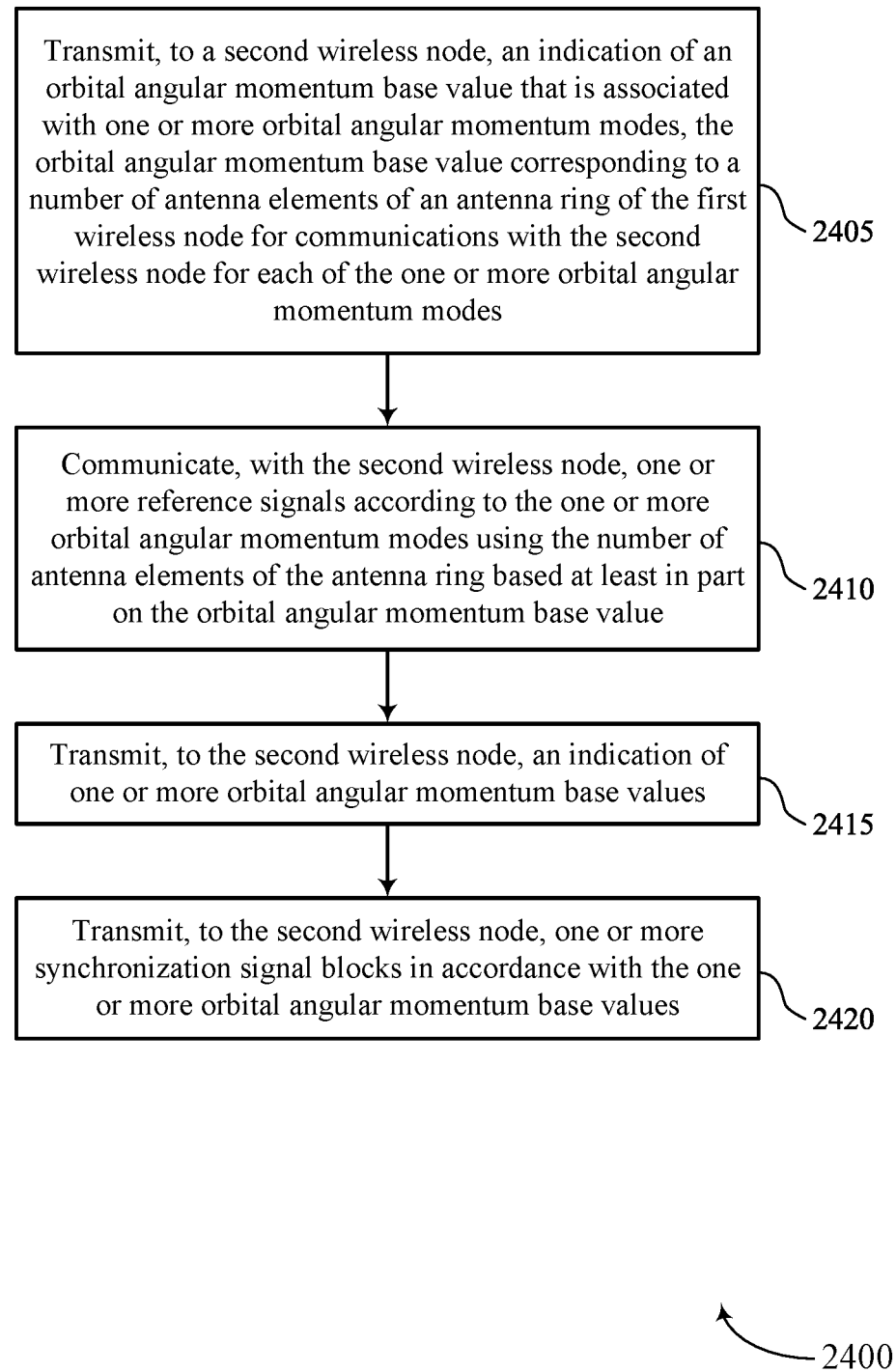

FIG. 24 shows a flowchart illustrating a method 2400 that supports OAM communication with variable antenna number in accordance with aspects of the present disclosure. The operations of the method 2400 may be implemented by a base station or its components as described herein. For example, the operations of the method 2400 may be performed by a base station 105 as described with reference to FIGS. 1 through 14. In some examples, a base station may execute a set of instructions to control the functional elements of the base station to perform the described functions. Additionally or alternatively, the base station may perform aspects of the described functions using special-purpose hardware.

At 2405, the method may include transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 2405 may be performed in accordance with examples as disclosed herein. In some examples, aspects of the operations of 2405 may be performed by a OAM base indication component 1325 as described with reference to FIG. 13.

At 2410, the method may include communicating, with the second wireless node, one or more reference signals according to the one or more OAM modes using the number of antenna elements of the antenna ring based on the OAM base value. The operations of 2410 may be performed in accordance with examples as disclosed herein. In some examples, aspects of the operations of 2410 may be performed by an antenna ring signaling component 1330 as described with reference to FIG. 13.

At 2415, the method may include transmitting, to the second wireless node, an indication of one or more OAM base values. The operations of 2415 may be performed in accordance with examples as disclosed herein. In some examples, aspects of the operations of 2415 may be performed by a OAM base indication component 1325 as described with reference to FIG. 13.

At 2420, the method may include transmitting, to the second wireless node, one or more synchronization signal blocks in accordance with the one or more OAM base values. The operations of 2420 may be performed in accordance with examples as disclosed herein. In some examples, aspects of the operations of 2420 may be performed by an SSB transmission component 1350 as described with reference to FIG. 13.

Figure 25:
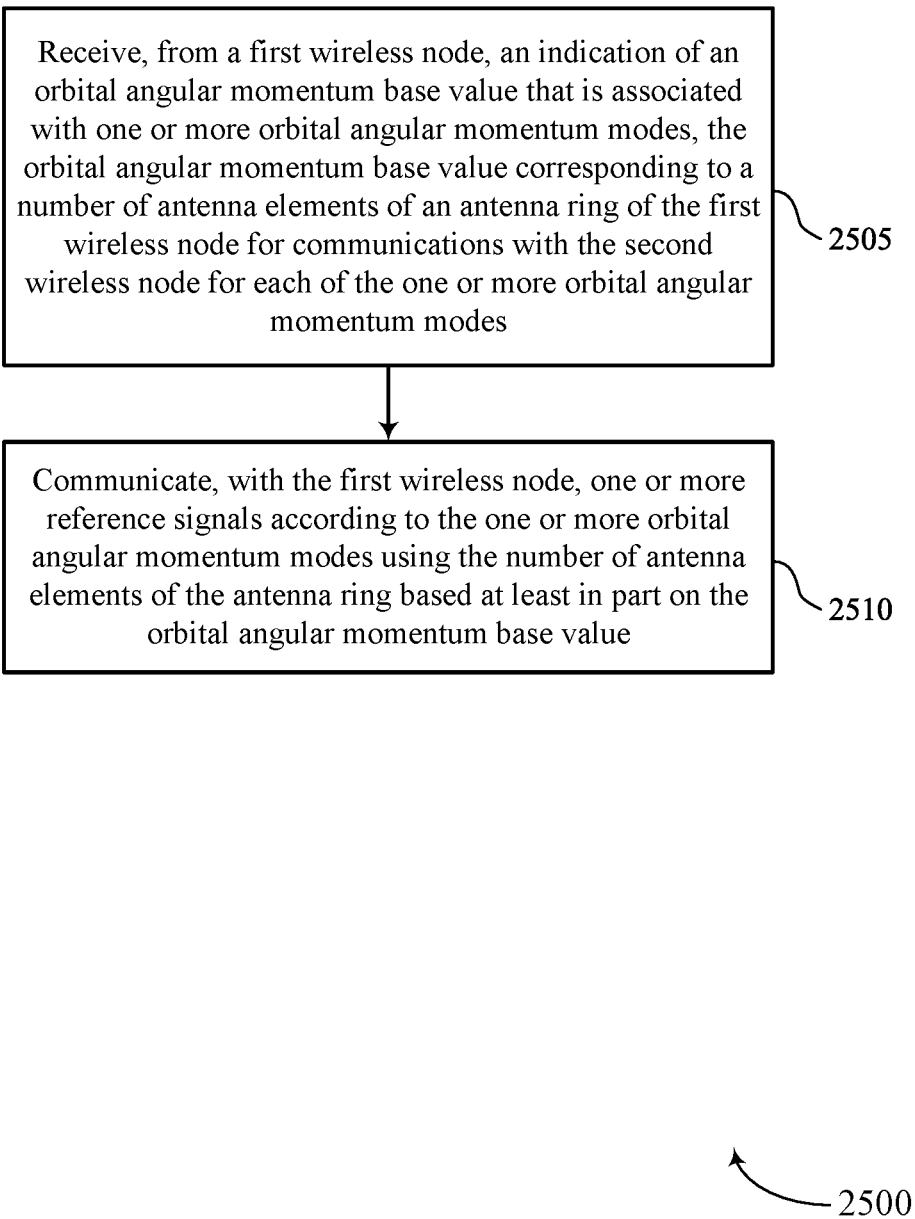

FIG. 25 shows a flowchart illustrating a method 2500 that supports OAM communication with variable antenna number in accordance with aspects of the present disclosure. The operations of the method 2500 may be implemented by a UE or its components as described herein. For example, the operations of the method 2500 may be performed by a UE 115 as described with reference to FIGS. 1 through 10 and 15 through 18. In some examples, a UE may execute a set of instructions to control the functional elements of the UE to perform the described functions. Additionally or alternatively, the UE may perform aspects of the described functions using special-purpose hardware.

At 2505, the method may include receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes. The operations of 2505 may be performed in accordance with examples as disclosed herein. In some examples, aspects of the operations of 2505 may be performed by a OAM base indication component 1725 as described with reference to FIG. 17.

At 2510, the method may include communicating, with the first wireless node, one or more reference signals according to the one or more OAM modes using the number of antenna elements of the antenna ring based on the OAM base value. The operations of 2510 may be performed in accordance with examples as disclosed herein. In some examples, aspects of the operations of 2510 may be performed by an antenna ring signaling component 1730 as described with reference to FIG. 17.

The following provides an overview of aspects of the present disclosure:

Aspect 1: A method for wireless communications at a first wireless node, comprising: transmitting, to a second wireless node, an indication of an OAM base value that is associated with one or more OAM modes, the OAM base value corresponding to a number of antenna elements of an antenna ring of the first wireless node for communications with the second wireless node for each of the one or more OAM modes; and communicating, with the second wireless node, one or more reference signals according to the one or more OAM modes using the number of antenna elements of the antenna ring based at least in part on the OAM base value.

Aspect 2: The method of aspect 1, wherein communicating comprises communicating the one or more reference signals using one or more sub-rings of the antenna ring, wherein each sub-ring of the one or more sub-rings is associated with a respective OAM mode of the one or more OAM modes.

Aspect 3: The method of aspect 2, wherein each sub-ring of the one or more sub-rings is associated with a different radio frequency chain for communicating with the second wireless node and a set of the one or more sub-rings comprises the number of antenna elements.

Aspect 4: The method of any of aspects 1 through 3, further comprising: applying, to one or more data streams associated with the one or more reference signals, a set of precoding weights based at least in part on the one or more OAM modes and the OAM base value.

Aspect 5: The method of any of aspects 1 through 4, wherein communicating comprises communicating, with the second wireless node, multiple reference signals according to the one or more OAM modes using one or more sub-rings of the antenna ring, each of the one or more OAM modes corresponding to a respective set of one or more sub-rings of the antenna ring.

Aspect 6: The method of any of aspects 1 through 5, wherein the indication of the OAM base value comprises a plurality of base values for a reference signal of the one or more reference signals, wherein the communicating comprises: transmitting a first instance of the reference signal using a first set of one or more sub-rings of the antenna ring based at least in part on a first base value of the plurality of base values, the first base value indicating a first number of antenna elements for the first set of one or more sub-rings; and transmitting a second instance of the reference signal using a second set of one or more sub-rings of the antenna ring based at least in part on a second base value of the plurality of base values, the second base value indicating a second number of antenna elements for the second set of one or more sub-rings.

Aspect 7: The method of aspect 6, wherein each of the first instance and the second instance comprises a CSI-RSs precoded according to a set of OAM modes corresponding to the first base value and the second base value.

Aspect 8: The method of any of aspects 1 through 7, further comprising: receiving, from the second wireless node, one or more CSI reports corresponding to the one or more reference signals, the one or more CSI reports indicating the OAM base value.

Aspect 9: The method of any of aspects 1 through 8, further comprising: receiving, from the second wireless node, an indication of the OAM base value selected by the second wireless node, wherein the indication comprises OAM base information; and receiving, from the second wireless node, one or more CSI reports associated with the OAM base value based at least in part on the OAM base information.

Aspect 10: The method of any of aspects 1 through 9, further comprising: transmitting, to the second wireless node, an indication of one or more OAM base values; and transmitting, to the second wireless node, one or more SSBs in accordance with the one or more OAM base values.

Aspect 11: The method of any of aspects 1 through 10, wherein communicating comprises receiving, from the second wireless node, one or more SRSs in accordance the OAM base value.

Aspect 12: The method of any of aspects 1 through 11, wherein the OAM base value is selected from a set of OAM base values, each of the set of OAM base values corresponding to a respective number of antenna elements of the antenna ring used for communications with the second wireless node.

Aspect 13: A method for wireless communications at a second wireless node, comprising: receiving, from a first wireless node, an indication of an OAM base value that is associated with one or more OAM modes, the OAM base value corresponding to a number of antenna elements of an antenna ring of the first wireless node for communications with the second wireless node for each of the one or more OAM modes; and communicating, with the first wireless node, one or more reference signals according to the one or more OAM modes using the number of antenna elements of the antenna ring based at least in part on the OAM base value.

Aspect 14: The method of aspect 13, wherein communicating comprises communicating the one or more reference signals using one or more sub-rings of the antenna ring, wherein each sub-ring of the one or more sub-rings is associated with a respective OAM mode of the one or more OAM modes.

Aspect 15: The method of aspect 14, wherein each sub-ring of the one or more sub-rings is associated with a different radio frequency chain for communicating with the first wireless node and a set of the one or more sub-rings comprises the number of antenna elements.

Aspect 16: The method of any of aspects 13 through 15, further comprising: applying, to one or more data streams associated with the one or more reference signals, a set of precoding weights based at least in part on the one or more OAM modes and the OAM base value.

Aspect 17: The method of any of aspects 13 through 16, wherein communicating comprises communicating, with the first wireless node, multiple reference signals with the first wireless node using according to the one or more OAM modes using one or more sub-rings of the antenna ring, each of the one or more OAM modes corresponding to a respective set of one or more sub-rings of the antenna ring.

Aspect 18: The method of any of aspects 13 through 17, wherein the indication of the OAM base value comprises a plurality of base values for a reference signal of the one or more reference signals, wherein the communicating comprises: receiving a first instance of the reference signal using a first set of one or more sub-rings of the antenna ring based at least in part on a first base value of the plurality of base values, the first base value indicating a first number of antenna elements for the first set of one or more sub-rings; and receiving a second instance of the reference signal using a second set of one or more sub-rings of the antenna ring based at least in part on a second base value of the plurality of base values, the second base value indicating a second number of antenna elements for the second set of one or more sub-rings.

Aspect 19: The method of aspect 18, wherein each of the first instance and the second instance comprises a CSI-RSs precoded according to a set of OAM modes corresponding to the first base value and the second base value.

Aspect 20: The method of any of aspects 18 through 19, further comprising: transmitting, to the first wireless node, one or more CSI reports corresponding to the one or more reference signals, the one or more CSI reports indicating the OAM base value.

Aspect 21: The method of any of aspects 18 through 20, further comprising: selecting one or more OAM base values to use for communications with the first wireless node, wherein the indication comprises OAM base information; and transmitting, to the first wireless node, one or more CSI reports including an indication of the OAM base information.

Aspect 22: The method of any of aspects 13 through 21, further comprising: receiving, from the first wireless node, an indication of one or more OAM base values; and receiving, from the first wireless node, one or more SSBs in accordance with the one or more OAM base values.

Aspect 23: The method of any of aspects 13 through 22, further comprising: receiving, from the first wireless node, an indication of one or more OAM base values; transmitting, to the first wireless node, one or more SRSs in accordance with the one or more OAM base values.

Aspect 24: The method of any of aspects 13 through 23, wherein the OAM base value is selected from a set of OAM base values, each of the set of OAM base values corresponding to a respective number of antenna elements of the antenna ring used for communications with the first wireless node.

Aspect 25: An apparatus for wireless communications at a first wireless node, comprising a processor; memory coupled with the processor; and instructions stored in the memory and executable by the processor to cause the apparatus to perform a method of any of aspects 1 through 12.

Aspect 26: An apparatus for wireless communications at a first wireless node, comprising at least one means for performing a method of any of aspects 1 through 12.

Aspect 27: A non-transitory computer-readable medium storing code for wireless communications at a first wireless node, the code comprising instructions executable by a processor to perform a method of any of aspects 1 through 12.

Aspect 28: An apparatus for wireless communications at a second wireless node, comprising a processor; memory coupled with the processor; and instructions stored in the memory and executable by the processor to cause the apparatus to perform a method of any of aspects 13 through 24.

Aspect 29: An apparatus for wireless communications at a second wireless node, comprising at least one means for performing a method of any of aspects 13 through 24.

Aspect 30: A non-transitory computer-readable medium storing code for wireless communications at a second wireless node, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless node, comprising:
   transmitting, to a second wireless node, an indication of an orbital angular momentum base value that is associated with one or more orbital angular momentum modes, the orbital angular momentum base value corresponding to a number of antenna elements of an antenna ring of the first wireless node for communications with the second wireless node for each of the one or more orbital angular momentum modes; and
   communicating, with the second wireless node, one or more reference signals according to the one or more orbital angular momentum modes using the number of antenna elements of the antenna ring based at least in part on the orbital angular momentum base value.

2. The method of claim 1, wherein communicating comprises:
   communicating the one or more reference signals using one or more sub-rings of the antenna ring, wherein each sub-ring of the one or more sub-rings is associated with a respective orbital angular momentum mode of the one or more orbital angular momentum modes.

3. The method of claim 2, wherein each sub-ring of the one or more sub-rings is associated with a different radio frequency chain for communicating with the second wireless node and a set of the one or more sub-rings comprises the number of antenna elements.

4. The method of claim 1, further comprising:
   applying, to one or more data streams associated with the one or more reference signals, a set of precoding weights based at least in part on the one or more orbital angular momentum modes and the orbital angular momentum base value.

5. The method of claim 1, wherein communicating comprises:
   communicating, with the second wireless node, multiple reference signals according to the one or more orbital angular momentum modes using one or more sub-rings of the antenna ring, each of the one or more orbital angular momentum modes corresponding to a respective set of one or more sub-rings of the antenna ring.

6. The method of claim 1, wherein the indication of the orbital angular momentum base value comprises a plurality of base values for a reference signal of the one or more reference signals, wherein the communicating comprises:
   transmitting a first instance of the reference signal using a first set of one or more sub-rings of the antenna ring based at least in part on a first base value of the plurality of base values, the first base value indicating a first number of antenna elements for the first set of one or more sub-rings; and
   transmitting a second instance of the reference signal using a second set of one or more sub-rings of the antenna ring based at least in part on a second base value of the plurality of base values, the second base value indicating a second number of antenna elements for the second set of one or more sub-rings.

7. The method of claim 6, wherein each of the first instance and the second instance comprises a channel state information reference signals precoded according to a set of orbital angular momentum modes corresponding to the first base value and the second base value.

8. The method of claim 1, further comprising:
   receiving, from the second wireless node, one or more channel state information reports corresponding to the one or more reference signals, the one or more channel state information reports indicating the orbital angular momentum base value.

9. The method of claim 1, further comprising:
   receiving, from the second wireless node, an indication of the orbital angular momentum base value selected by the second wireless node, wherein the indication comprises orbital angular momentum base information; and
   receiving, from the second wireless node, one or more channel state information reports associated with the orbital angular momentum base value based at least in part on the orbital angular momentum base information.

10. The method of claim 1, further comprising:
    transmitting, to the second wireless node, an indication of one or more orbital angular momentum base values; and
    transmitting, to the second wireless node, one or more synchronization signal blocks in accordance with the one or more orbital angular momentum base values.

11. The method of claim 1, wherein communicating comprises:
    receiving, from the second wireless node, one or more sounding reference signals in accordance the orbital angular momentum base value.

12. The method of claim 1, wherein the orbital angular momentum base value is selected from a set of orbital angular momentum base values, each of the set of orbital angular momentum base values corresponding to a respective number of antenna elements of the antenna ring used for communications with the second wireless node.

13. A method for wireless communications at a second wireless node, comprising:
receiving, from a first wireless node, an indication of an orbital angular momentum base value that is associated with one or more orbital angular momentum modes, the orbital angular momentum base value corresponding to a number of antenna elements of an antenna ring of the first wireless node for communications with the second wireless node for each of the one or more orbital angular momentum modes; and
communicating, with the first wireless node, one or more reference signals according to the one or more orbital angular momentum modes using the number of antenna elements of the antenna ring based at least in part on the orbital angular momentum base value.

14. The method of claim 13, wherein communicating comprises:
communicating the one or more reference signals using one or more sub-rings of the antenna ring, wherein each sub-ring of the one or more sub-rings is associated with a respective orbital angular momentum mode of the one or more orbital angular momentum modes.

15. The method of claim 14, wherein each sub-ring of the one or more sub-rings is associated with a different radio frequency chain for communicating with the first wireless node and a set of the one or more sub-rings comprises the number of antenna elements.

16. The method of claim 13, further comprising:
applying, to one or more data streams associated with the one or more reference signals, a set of precoding weights based at least in part on the one or more orbital angular momentum modes and the orbital angular momentum base value.

17. The method of claim 13, wherein communicating comprises:
communicating, with the first wireless node, multiple reference signals with the first wireless node using according to the one or more orbital angular momentum modes using one or more sub-rings of the antenna ring, each of the one or more orbital angular momentum modes corresponding to a respective set of one or more sub-rings of the antenna ring.

18. The method of claim 13, wherein the indication of the orbital angular momentum base value comprises a plurality of base values for a reference signal of the one or more reference signals, wherein the communicating comprises:
receiving a first instance of the reference signal using a first set of one or more sub-rings of the antenna ring based at least in part on a first base value of the plurality of base values, the first base value indicating a first number of antenna elements for the first set of one or more sub-rings; and
receiving a second instance of the reference signal using a second set of one or more sub-rings of the antenna ring based at least in part on a second base value of the plurality of base values, the second base value indicating a second number of antenna elements for the second set of one or more sub-rings.

19. The method of claim 18, wherein each of the first instance and the second instance comprises a channel state information reference signals precoded according to a set of orbital angular momentum modes corresponding to the first base value and the second base value.

20. The method of claim 18, further comprising:
transmitting, to the first wireless node, one or more channel state information reports corresponding to the one or more reference signals, the one or more channel state information reports indicating the orbital angular momentum base value.

21. The method of claim 18, further comprising:
selecting one or more orbital angular momentum base values to use for communications with the first wireless node, wherein the indication comprises orbital angular momentum base information; and
transmitting, to the first wireless node, one or more channel state information reports including an indication of the orbital angular momentum base information.

22. The method of claim 13, further comprising:
receiving, from the first wireless node, an indication of one or more orbital angular momentum base values; and
receiving, from the first wireless node, one or more synchronization signal blocks in accordance with the one or more orbital angular momentum base values.

23. The method of claim 13, further comprising:
receiving, from the first wireless node, an indication of one or more orbital angular momentum base values;
transmitting, to the first wireless node, one or more sounding reference signals in accordance with the one or more orbital angular momentum base values.

24. The method of claim 13, wherein the orbital angular momentum base value is selected from a set of orbital angular momentum base values, each of the set of orbital angular momentum base values corresponding to a respective number of antenna elements of the antenna ring used for communications with the first wireless node.

25. An apparatus for wireless communications at a first wireless node, comprising:
a processor;
memory coupled with the processor; and
instructions stored in the memory, wherein the instructions are executable by the processor to:
transmit, to a second wireless node, an indication of an orbital angular momentum base value that is associated with one or more orbital angular momentum modes, the orbital angular momentum base value corresponding to a number of antenna elements of an antenna ring of the first wireless node for communications with the second wireless node for each of the one or more orbital angular momentum modes; and
communicate, with the second wireless node, one or more reference signals according to the one or more orbital angular momentum modes using the number of antenna elements of the antenna ring based at least in part on the orbital angular momentum base value.

26. The apparatus of claim 25, wherein the instructions executable by the processor to communicate the one or more reference signals comprise instructions executable by the processor to:
communicate the one or more reference signals using one or more sub-rings of the antenna ring, wherein each sub-ring of the one or more sub-rings is associated with a respective orbital angular momentum mode of the one or more orbital angular momentum modes.

27. The apparatus of claim 26, wherein each sub-ring of the one or more sub-rings is associated with a different radio frequency chain for communicating with the second wireless node and a set of the one or more sub-rings comprises the number of antenna elements.

28. The apparatus of claim 25, wherein the instructions are further executable by the processor to:

apply, to one or more data streams associated with the one or more reference signals, a set of precoding weights based at least in part on the one or more orbital angular momentum modes and the orbital angular momentum base value.

29. The apparatus of claim 25, wherein the instructions are further executable by the processor to:

communicate, with the second wireless node, multiple reference signals according to the one or more orbital angular momentum modes using one or more sub-rings of the antenna ring, each of the one or more orbital angular momentum modes corresponding to a respective set of one or more sub-rings of the antenna ring.

30. An apparatus for wireless communications at a second wireless node, comprising:

a processor;

memory coupled with the processor; and instructions stored in the memory and executable by the processor to cause the apparatus to:

receive, from a first wireless node, an indication of an orbital angular momentum base value that is associated with one or more orbital angular momentum modes, the orbital angular momentum base value corresponding to a number of antenna elements of an antenna ring of the first wireless node for communications with the second wireless node for each of the one or more orbital angular momentum modes; and communicate, with the first wireless node, one or more reference signals according to the one or more orbital angular momentum modes using the number of antenna elements of the antenna ring based at least in part on the orbital angular momentum base value.

* * * * *